United States Patent
Umetsu et al.

(10) Patent No.: US 10,085,306 B2
(45) Date of Patent: *Sep. 25, 2018

(54) TRANSVERSE FLUX INDUCTION HEATING DEVICE

(71) Applicant: NIPPON STEEL & SUMITOMO METAL CORPORATION, Chiyoda-ku, Tokyo (JP)

(72) Inventors: Kenji Umetsu, Tokyo (JP); Tsutomu Ueki, Tokyo (JP); Yasuhiro Mayumi, Tokyo (JP); Toshiya Takechi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,092

(22) Filed: Jan. 11, 2017

(65) Prior Publication Data

US 2017/0127482 A1    May 4, 2017

Related U.S. Application Data

(63) Continuation of application No. 13/579,063, filed as application No. PCT/JP2011/053484 on Feb. 18, 2011, now Pat. No. 9,578,693.

(30) Foreign Application Priority Data

Feb. 19, 2010 (JP) ................................. 2010-035199

(51) Int. Cl.
*H05B 6/10* (2006.01)
*H05B 6/16* (2006.01)
(Continued)

(52) U.S. Cl.
CPC ............... *H05B 6/103* (2013.01); *C21D 1/42* (2013.01); *C21D 9/005* (2013.01); *C21D 9/0012* (2013.01); *C21D 9/46* (2013.01)

(58) Field of Classification Search
CPC ........ H05B 6/103; H05B 6/104; H05B 6/362; H05B 6/365; H05B 6/04; C21D 9/005;
(Continued)

(56) References Cited

U.S. PATENT DOCUMENTS 2,722,589 A    11/1955   Marquardt
4,678,883 A     7/1987   Saitoh
(Continued)

FOREIGN PATENT DOCUMENTS

CN    101120617    2/2008
JP     62-035490    2/1987
(Continued)

OTHER PUBLICATIONS

European Search Report dated Nov. 3, 2015 in corresponding European Application No. 11744740.9.
(Continued)

*Primary Examiner* — Hung D Nguyen
(74) *Attorney, Agent, or Firm* — Birch, Stewart, Kolasch & Birch, LLP

(57) ABSTRACT

The transverse flux induction heating device allows an alternating magnetic field to intersect the sheet face of a conductive sheet which is conveyed in one direction, thereby inductively heating the conductive sheet. The transverse flux induction heating device includes a heating coil disposed such that a coil face faces the sheet face of the conductive sheet; a core around which the heating coil is coiled; and a shielding plate formed of a conductor and disposed between the core and a side end portion in a direction perpendicular to the conveyance direction of the (Continued)

conductive sheet, wherein the shielding plate has a protruded portion, and the side surface of the protruded portion represents a closed loop when viewed from a direction perpendicular to the coil face.

9 Claims, 17 Drawing Sheets

(51) Int. Cl.
    *H05B 6/36*     (2006.01)
    *C21D 9/46*     (2006.01)
    *C21D 9/00*     (2006.01)
    *C21D 1/42*     (2006.01)

(58) Field of Classification Search
    CPC .......... C21D 9/0012; C21D 9/46; C21D 9/60; C21D 1/42
    USPC ....... 219/645, 646, 639, 600, 619, 653, 635, 219/662, 630, 672, 676
    See application file for complete search history.

(56) References Cited

U.S. PATENT DOCUMENTS

| | | | |
|---|---|---|---|
| 4,751,360 A | 6/1988 | Ross | |
| 4,795,872 A | 1/1989 | Hagisawa | |
| 5,397,877 A | 3/1995 | Couffet | |
| 5,739,506 A | 4/1998 | Hanton | |
| 2001/0001465 A1* | 5/2001 | Inoh | H05B 6/104 219/646 |
| 2005/0230380 A1* | 10/2005 | Yoshino | B05D 3/0281 219/635 |
| 2007/0181567 A1 | 8/2007 | Lovens | |

FOREIGN PATENT DOCUMENTS

| | | |
|---|---|---|
| JP | 05-266975 A | 10/1993 |
| JP | 2001-006861 A | 1/2001 |
| JP | 2003-133037 | 5/2003 |
| JP | 2010-044924 | 2/2010 |
| RU | 2 236 770 | 9/2004 |
| WO | WO1996/26296 A1 | 8/1996 |
| WO | WO 2005/004559 A2 | 1/2005 |
| WO | WO 2007/101058 | 9/2007 |
| WO | WO2008/130049 | 10/2008 |

OTHER PUBLICATIONS

International Search Report dated May 24, 2011, issued in corresponding PCT Application No. PCT/JP2011/053484.

Notice of Allowance dated Nov. 8, 2013 issued in corresponding RU Application No. 2012134920 [with English Translation].

Office Action dated Mar. 5, 2014 issued in corresponding CN Application No. 201180009736.X [With English Translation of Search Report].

Final Office Action dated Mar. 11, 2016 in co-pending U.S. Appl. No. 13/579,063.

Non-Final Office Action dated Sep. 1, 2015 in co-pending U.S. Appl. No. 13/579,063.

Notice of Allowance dated Oct. 12, 2016 in co-pending U.S. Appl. No. 13/579,063.

Restriction Requirement dated May 11, 2015 in co-pending U.S. Appl. No. 13/579,063.

* cited by examiner

TRANSVERSE FLUX INDUCTION HEATING DEVICE

CROSS-REFERENCE TO RELATED APPLICATIONS

This application is a Continuation of copending application Ser. No. 13/579,063, filed on Aug. 15, 2012, which was filed as PCT International Application No. PCT/JP2011/053484 on Feb. 18, 2011, which claims the benefit under 35 U.S.C. § 119(a) to Patent Application No. 2010-035199, filed in Japan on Feb. 19, 2010, all of which are hereby expressly incorporated by reference into the present application.

FIELD OF THE INVENTION

The present invention relates to a transverse flux induction heating device. In particular, the transverse flux induction heating device is suitably used to inductively heat a conductive sheet by making an alternating magnetic field approximately perpendicularly intersect the conductive sheet.

Priority is claimed on Japanese Patent Application No. 2010-35199, filed on Feb. 19, 2010, the content of which is incorporated herein by reference.

DESCRIPTION OF RELATED ART

In the past, heating a conductive sheet, such as a steel sheet, using an induction heating device has been performed. The induction heating device generates Joule heat based on an eddy current which is induced in the conductive sheet by an alternating magnetic field (an alternating-current magnetic field) generated from a coil, in the conductive sheet, and heats the conductive sheet by the Joule heat. A transverse flux induction heating device is one type of such an induction heating device. The transverse flux induction heating device heats a conductive sheet of a heating target by making an alternating magnetic field approximately perpendicularly intersect the conductive sheet.

In the case of using such a transverse flux induction heating device, unlike the case of using a solenoid-type induction heating device, there is a problem in that both ends in the width direction (both side ends) of the conductive sheet of the heating target become overheated.

The techniques described in Patent Citation 1 and Patent Citation 2 are techniques related to such a problem.

In the technique described in Patent Citation 1, a movable plain shielding plate made of a non-magnetic metal is provided between a coil and each of both side ends of a conductive sheet of a heating target.

Further, in the technique described in Patent Citation 2, a rhombic coil and an oval coil which have different heating patterns are disposed along the conveyance direction of a conductive sheet of a heating target, thereby heating the conductive sheet in a desired heating pattern with respect to the width direction of the conductive sheet.

PATENT CITATION

[Patent Citation 1] Japanese Unexamined Patent Application, First Publication No. S62-35490
[Patent Citation 2] Japanese Unexamined Patent Application, First Publication No. 2003-133037

SUMMARY OF THE INVENTION

Problems to be Solved by the Invention

However, by only providing a plain shielding plate between the coil and each of both side ends of the conductive sheet of the heating target, as in the technique described in Patent Citation 1, since the eddy current spreads in an area slightly to the inside of both side ends of the conductive sheet, eddy current density is small, and since eddy currents flowing in both side ends of the conductive sheet cannot flow out of the conductive sheet, eddy current density becomes large at both side ends. Therefore, it is difficult to lower the temperatures of both side ends of the conductive sheet and the smoothness of the temperature distribution in the width direction of the conductive sheet is also significantly lowered (in particular, the slope of the temperature distribution at each of both side ends of the conductive sheet becomes large).

Further, in the technique described in Patent Citation 2, it is possible to suppress lowering of the smoothness of the temperature distribution in the width direction of the conductive sheet. However, if the sheet width of the conductive sheet is changed, the coil has to be reset depending on the sheet width. Therefore, a mechanism for moving the coil is required and it is difficult to easily and quickly respond to a change in sheet width.

In addition, in the techniques described in Patent Citation 1 and Patent Citation 2, if the conductive sheet moves in a meandering manner, the smoothness of the temperature distribution in the width direction of the conductive sheet is lowered.

The present invention has been made in view of such problems and has an object of providing a transverse flux induction heating device which allows unevenness of a temperature distribution in the width direction of a conductive sheet of a heating target to be reduced and allows variations in temperature distribution in the width direction of the conductive sheet of the heating target due to meandering of the conductive sheet to be reduced.

Methods for Solving the Problem (1) A transverse flux induction heating device according to an aspect of the present invention allows an alternating magnetic field to intersect the sheet face of a conductive sheet which is conveyed in one direction, thereby inductively heating the conductive sheet. The transverse flux induction heating device includes: a heating coil disposed such that a coil face faces the sheet face of the conductive sheet; a core around which the heating coil is coiled; and a shielding plate formed of a conductor and disposed between the core and a side end portion in a direction perpendicular to the conveyance direction of the conductive sheet, wherein the shielding plate has a protruded portion, and the side surface of the protruded portion represents a closed loop when viewed from a direction perpendicular to the coil face.

(2) The transverse flux induction heating device according to the above (1) may further include a non-conductive soft magnetic material which is attached to the shielding plate, wherein the shielding plate is interposed between the core and the non-conductive soft magnetic material.

(3) The transverse flux induction heating device according to the above (2) may further include a heat-resistant material which is attached to the non-conductive soft magnetic material, wherein the heat-resistant material is disposed closer to the conductive sheet than the non-conductive soft magnetic material.

(4) In the transverse flux induction heating device according to the above (2), the shielding plate may have a cross section parallel to the coil face, and the cross section may include the non-conductive soft magnetic material.

(5) In the transverse flux induction heating device according to the above (1) or (2), the protruded portion may be partially insulated in a direction perpendicular to the coil face.

(6) In the transverse flux induction heating device according to the above (1) or (2), a depressed portion which faces the side end portion in the direction perpendicular to the conveyance direction of the conductive sheet may be formed in the surface facing the conductive sheet of the shielding plate.

(7) In the transverse flux induction heating device according to the above (6), the protruded portion may be formed on the side surface of the depressed portion along a circumferential direction of the side surface of the depressed portion so as to protrude toward the inside of the depressed portion from the side surface of the depressed portion.

(8) In the transverse flux induction heating device according to the above (6), a portion which is tapered off toward a side close to a central portion in a direction perpendicular to the conveyance direction of the conductive sheet from a side away from the central portion in the direction perpendicular to the conveyance direction of the conductive sheet may be included in the depressed portion.

(9) In the transverse flux induction heating device according to the above (6), a first portion which is tapered off toward the downstream side from the upstream side in the conveyance direction of the conductive sheet and a second portion which is tapered off toward the upstream side from the downstream side in the conveyance direction of the conductive sheet may be included in the depressed portion, and the first portion and the second portion may face each other in the conveyance direction of the conductive sheet.

(10) In the transverse flux induction heating device according to the above (9), the first portion may be rounded toward the downstream side and the second portion may be rounded toward the upstream side.

Effects of the Invention

According to the present invention, the protruded portion is formed or disposed at the shielding plate which is disposed between the core around which the coil is coiled and an end portion in the width direction of the conductive sheet such that the side surface of the protruded portion represents a closed loop when viewed from the plate thickness direction of the shielding plate. By this protruded portion, it is possible to secure an eddy current flowing in the vicinity of the protruded portion. That is, it is possible to reliably flow the eddy current so as to follow the closed loop that the protruded portion represents. Therefore, unevenness of the temperature distribution in the width direction of the conductive sheet of a heating target can be reduced and variations in the temperature distribution in the width direction of the conductive sheet of the heating target due to meandering of the conductive sheet can be reduced.

DETAILED DESCRIPTION OF THE INVENTION

Figure 1:
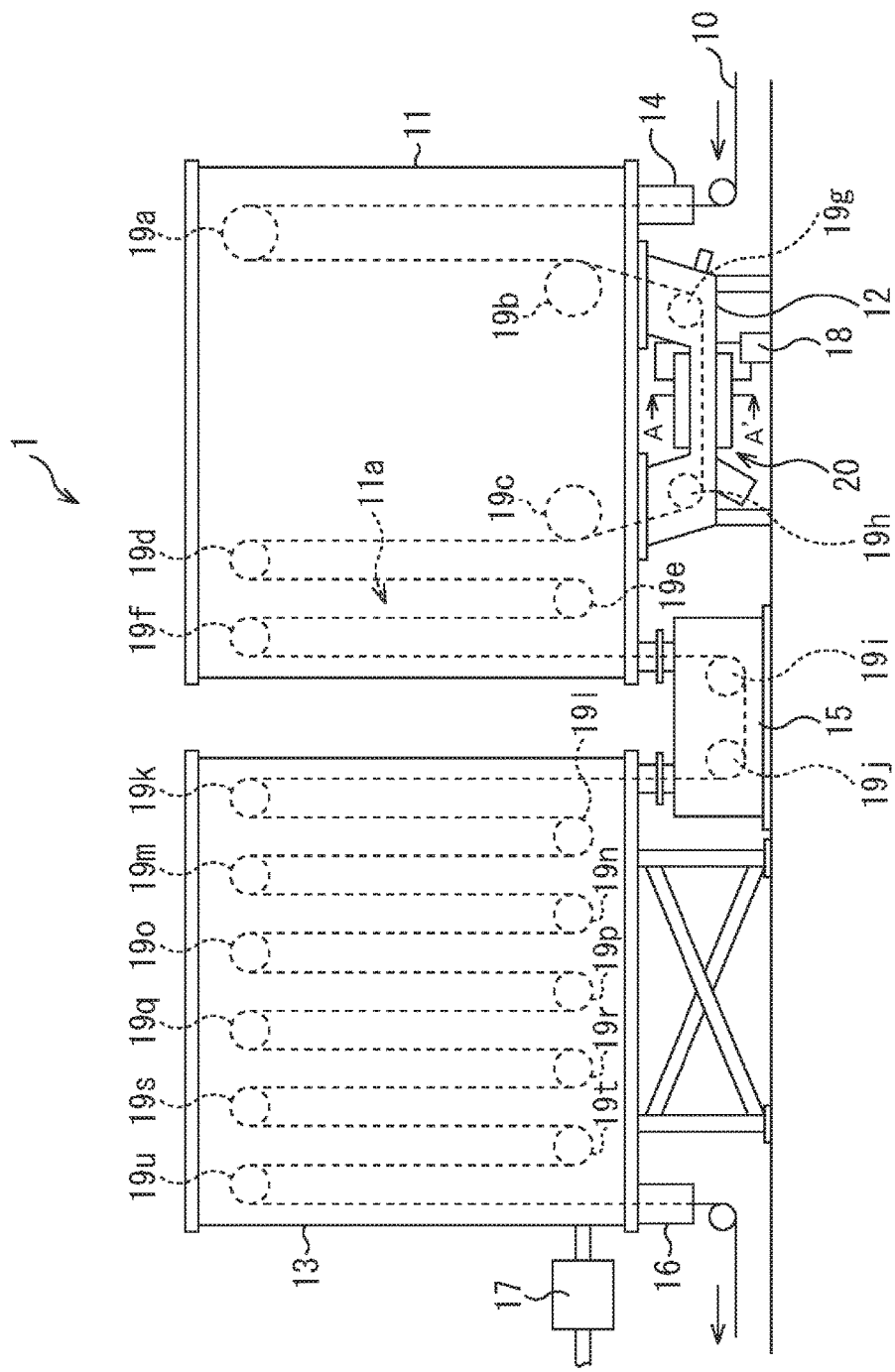
FIG. 1 is a side view showing one example of the schematic configuration of a continuous annealing line for a steel sheet according to a first embodiment of the present invention.

Hereinafter, embodiments of the present invention will be described referring to the drawings. In each embodiment described below, a case where a transverse flux induction heating device is applied to a continuous annealing line for a steel sheet is described as an example. In addition, in the following description, the "transverse flux induction heating device" is referred to as an "induction heating device" for brevity, as necessary.

First Embodiment

First, the first embodiment will be described.
[Configuration of Continuous Annealing Line]
FIG. 1 is a side view showing one example of the schematic configuration of a continuous annealing line for a steel sheet. In addition, in each drawing, for convenience of explanation, only the necessary configuration is simplified and shown.

In FIG. 1, a continuous annealing line 1 includes a first container 11, a second container 12, a third container 13, a first sealing roller assembly 14, a conveyance unit 15, a second sealing roller assembly 16, a gas supply unit 17, an alternating-current power supply unit 18, rollers 19a to 19u (19), and an induction heating device 20.

The first sealing roller assembly 14 transports a steel strip (a strip-shaped sheet) 10 into the first container 11 while shielding the first container 11 from the external air. The steel strip 10 conveyed into the first container 11 by the first sealing roller assembly 14 is conveyed into the second container 12 by the rollers 19a and 19b in the first container 11. The steel strip 10 conveyed into the second container 12 is conveyed into the first container 11 again by the rollers 19g and 19h while being heated by the induction heating device 20 disposed above and below the horizontal portion of the second container 12 (the steel strip 10 which is conveyed). Here, the induction heating device 20 is electrically connected to the alternating-current power supply unit 18 and receives alternating-current power from the alternating-current power supply unit 18, thereby generating an alternating magnetic field which intersects approximately perpendicularly to the sheet face of the steel strip 10, and inductively heating the steel strip 10. In addition, the details of the configuration of the induction heating device 20 will be described later. Further, in the following explanation, "electrical connection" is referred to as "connection" for brevity, as necessary.

The steel strip 10 returned into the first container 11 is conveyed to the conveyance unit 15 by way of a soaking and slow cooling stage by the rollers 19c to 19f. The steel strip 10 conveyed to the conveyance unit 15 is conveyed into the third container 13 by the rollers 19i and 19j. The steel strip 10 conveyed into the third container 13 is conveyed while moving in a vertically up and down manner by the rollers 19k to 19u and rapidly cooled in the third container 13.

The second sealing roller assembly 16 sends the steel strip 10 rapidly cooled in this way to a post-process while blocking the third container 13 from external air.

Into "the first container 11, the second container 12, the third container 13, and the conveyance unit 15" which become a "transport pathway of the steel strip 10" as described above, non-oxidizing gas is supplied by the gas supply unit 17. Then, by "the first sealing roller assembly 14 and the second sealing roller assembly 16" which block the inside (the inside of the continuous annealing line 1) from the outside (external air), a non-oxidizing gaseous atmosphere is maintained in the first container 11, the second container 12, the third container 13, and the conveyance unit 15.

[Configuration of Induction Heating Device]

Figure 2A:
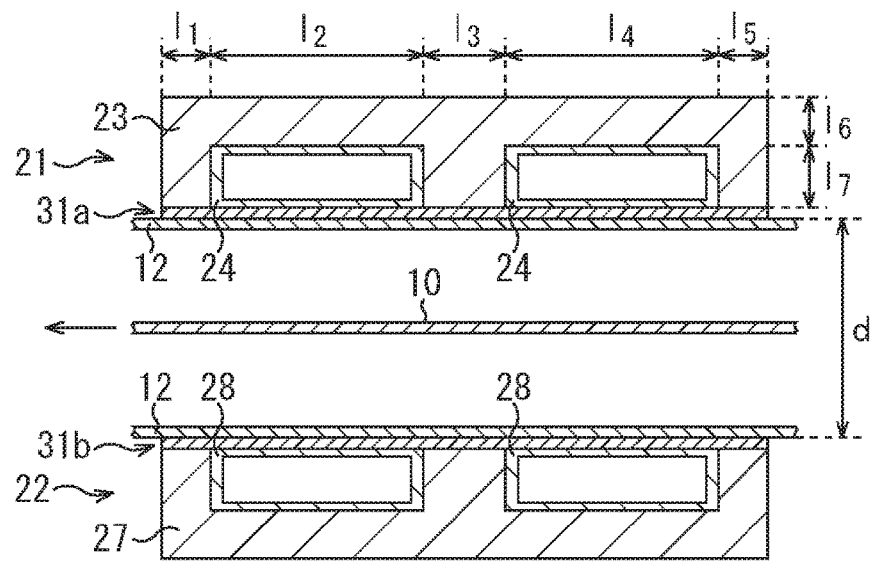
FIG. 2A is a vertical cross-sectional view showing one example of the configuration of an induction heating device according to the first embodiment.
Figure 2B:
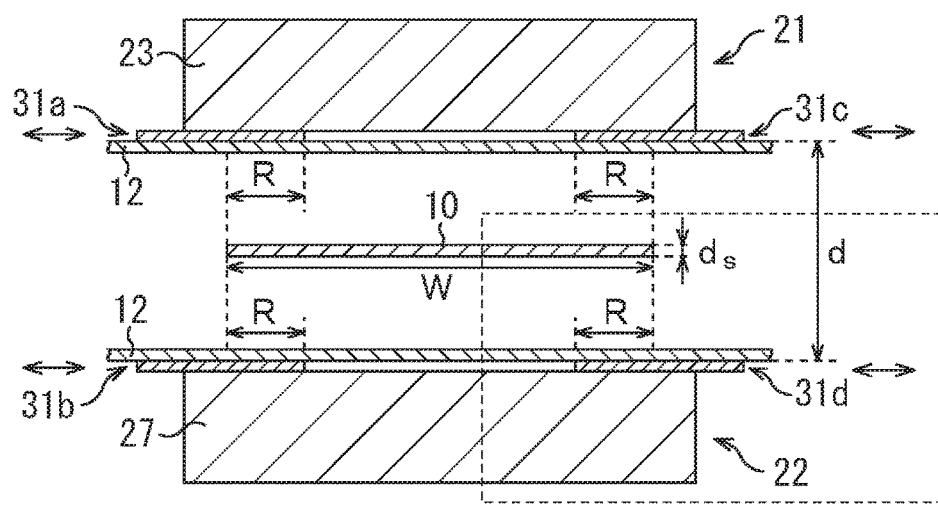
FIG. 2B is a vertical cross-sectional view showing one example of the configuration of the induction heating device according to the first embodiment.
Figure 2C:
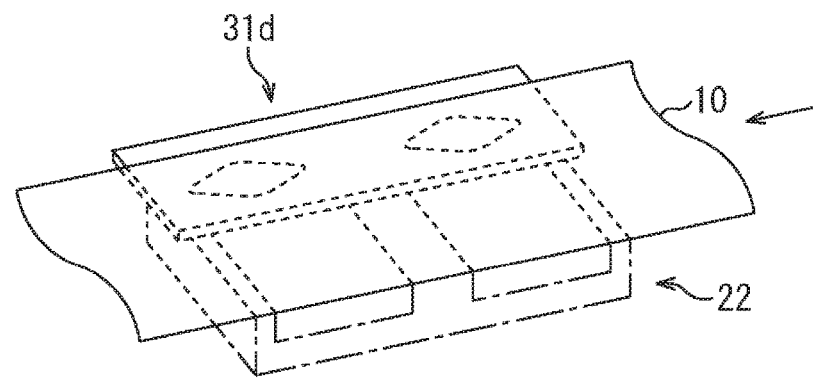
FIG. 2C is a fragmentary perspective view showing one example of the configuration of the induction heating device according to the first embodiment.

FIGS. 2A to 2C are diagrams showing one example of the configuration of the induction heating device.

Specifically, FIG. 2A is a diagram showing one example of the induction heating device 20 in this embodiment, as viewed from a side of the continuous annealing line, and is a vertical cross-sectional view cut (in the up-and-down direction in FIG. 1) along the longitudinal direction of the steel strip 10. In FIG. 2A, the steel strip 10 is conveyed in the left direction (refer to an arrow pointing from the right to the left in FIG. 2A). Further, FIG. 2B is a vertical cross-sectional view showing one example of the induction heating device 20 in this embodiment, as viewed in the direction of A-A' in FIG. 1 (that is, a diagram as viewed from the downstream in a sheet conveyance direction). In FIG. 2B, the steel strip 10 is conveyed in a direction from the back of the drawing to the front. Further, FIG. 2C is a fragmentary perspective view partially showing one example of the induction heating device 20 in this embodiment. In FIG. 2C, a lower right area shown in FIG. 2B is looked down from above the steel strip 10.

In FIGS. 2A to 2C, the induction heating device 20 includes an upper side inductor 21 and a lower side inductor 22.

The upper side inductor 21 includes a core 23, an upper side heating coil (a heating coil) 24, and shielding plates 31a and 31c.

The upper side heating coil 24 is a conductor coiled around the core 23 through a slot of the core 23 (here, a depressed portion of the core 23) and is a coil (a so-called single turn) in which the number of turns is "1". Further, as shown in FIG. 2A, the upper side heating coil 24 has a portion, the vertical cross-sectional shape of which is a hollow rectangle. A water-cooling pipe is connected to the end face of a hollow portion of the hollow rectangle. Cooling water which is supplied from the water-cooling pipe flows in the hollow portion (the inside of the upper side heating coil 24) of the hollow rectangle, so that the upper side inductor 21 is cooled. Further, the shielding plates 31a and 31c are mounted on the bottom surface (the slot side) of the core 23.

In addition, in FIG. 2A, a length $l_1$ in the upper side inductor 21 is 45 [mm], a length $l_2$ is 180 [mm], a length $l_3$ is 80 [mm], a length $l_4$ is 180 [mm], a length $l_5$ is 45 [mm], a length $l_6$ is 45 [mm], and a length $l_7$ is 45 [mm]. Further, a width W of the steel strip 10 is 900 [mm] and a thickness $d_s$ is 0.3 [mm]. However, these dimensions are not limited to the values described above.

The lower side inductor 22 includes a core 27, a lower side heating coil (a heating coil) 28, and shielding plates 31b and 31d, similarly to the upper side inductor 21.

The lower side heating coil 28 is also a conductor coiled around the core 27 through a slot of the core 27 and is a coil (a so-called single turn) in which the number of turns is "1", similarly to the upper side heating coil 24. Further, the lower side heating coil 28 has a portion, the vertical cross-sectional shape of which is a hollow rectangle, similarly to the upper side heating coil 24. A water-cooling pipe is connected to the end face of a hollow portion of the hollow rectangle and can flow cooling water into the hollow portion of the hollow rectangle.

Further, a coil face (a face in which a loop is formed; a face in which a line of magnetic force penetrates) of the upper side heating coil 24 of the upper side inductor 21 and a coil face of the lower side heating coil 28 of the lower side inductor 22 face each other with the steel strip 10 interposed therebetween. In addition, the plate faces of the shielding plates 31a to 31d (31) face side end portions (edges) in the sheet width direction of the steel strip 10. In order to satisfy such a positional relationship, the upper side inductor 21 is provided further on the upper side (in the vicinity of the upper surface of the horizontal portion of the second container 12) than the steel strip 10 and the lower side inductor 22 is provided further on the lower side (in the vicinity of the lower surface of the horizontal portion of the second container 12) than the steel strip 10.

As described above, the upper side inductor 21 and the lower side inductor 22 are different in the position to be disposed, but have the same configuration.

Further, in this embodiment, the shielding plates 31a to 31d can be individually moved in the width direction (a direction of a double-headed arrow shown in FIG. 2B) of the steel strip 10 based on an operation of a driving device (not shown).

Further, in this embodiment, a distance d between the upper side heating coil 24 and the lower side heating coil 28, the heating coil widths $l_2$ and $l_4$ in the upper side heating coil 24, and the heating coil widths $l_2$ and $l_4$ in the lower side heating coil 28 are the same. Further, a position where an "overlap length R in the width direction of the steel strip 10" between each of both side end portions of the steel strip 10 and each of the shielding plates 31a to 31d is 90 [mm] is defined as the reference position.

Here, the heating coil width is the length in the width direction of the upper side heating coil 24 (the lower side heating coil 28) that is in the slot. In the example shown in FIG. 2A, the heating coil width is equal to the length in the width direction of each of the copper pipes 41a to 41d shown in FIG. 3, which will be described later, and is approximately the same length as the width of the slot of each of the cores 23 and 27.

In addition, in the following explanation, each of the heating coil width of the upper side heating coil 24 and the heating coil width of the lower side heating coil 28 is simply referred to as a heating coil width, as necessary, and the distance between the upper side heating coil 24 and the lower side heating coil 28 is referred to as a gap, as necessary.

[Configuration of Heating Coil]

Figure 3:
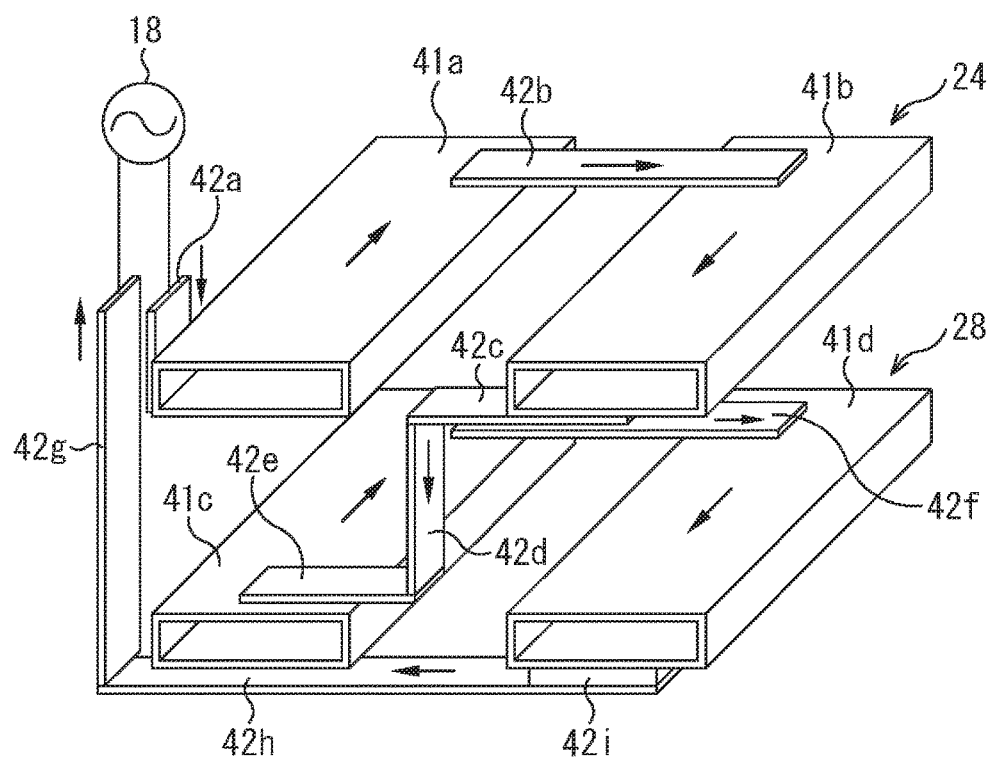
FIG. 3 is a diagram showing one example of the configurations of an upper side heating coil and a lower side heating coil according to the first embodiment.

FIG. 3 is a diagram showing one example of the configurations of the upper side heating coil 24 and the lower side heating coil 28. In addition, an arrow shown in FIG. 3 represents one example of a direction in which an electric current flows at a certain time.

As shown in FIG. 3, the upper side heating coil 24 has the copper pipes 41a and 41b, and a copper bus bar (a connection plate) 42b which is connected to the base end sides of the copper pipes 41a and 41b. Further, the lower side heating coil 28 has the copper pipes 41c and 41d, and a copper bus bar 42f which is connected to the base end sides of the copper pipes 41c and 41d.

One end (the front end side of the copper pipe 41a) of the upper side heating coil 24 and an output terminal on one side of the alternating-current power supply unit 18 are mutually connected through a copper bus bar 42a. On the other hand, the other end (the front end side of the copper pipe 41b) of the upper side heating coil 24 and one end (the front end side of the copper pipe 41c) of the lower side heating coil 28 are mutually connected through copper bus bars 42c to 42e. Further, the other end (the front end side of the copper pipe 41d) of the lower side heating coil 28 is mutually connected to an output terminal on the other side of the alternating-current power supply unit 18 through copper bus bars 42i, 42h, and 42g.

As described above, the upper side heating coil 24 and the lower side heating coil 28 are connected in series with respect to the alternating-current power supply unit 18 by the combination of the copper pipes 41a to 41d (41) and the copper bus bars 42a to 42i (42) and form coils each of which the number of turns is "1". In FIG. 3, a large magnetic flux is generated toward the bottom from the top of a central portion surrounded by the copper pipes 41 and the copper bus bars 42, and the magnetic flux passes through the steel strip 10, whereby Joule heat is generated in the steel strip 10, so that the steel strip 10 is heated.

In addition, here, in order to clearly illustrate the configurations of the upper side heating coil 24 and the lower side heating coil 28, as shown in FIG. 3, the copper pipes 41a to 41d and the copper bus bars 42a to 42g are connected to each other. However, when the upper side heating coil 24 and the lower side heating coil 28 are coiled around the cores 23 and 27, there is a need to pass (attach) the copper pipes 41a to 41d through the slots of the cores 23 and 27. Therefore, in fact, the copper bus bars 42 are attached to the copper pipes 41a to 41d to avoid portions where the copper pipes 41 are installed to the cores 23 and 27.

[Configuration of Shielding Plate]

FIGS. 4A to 4D are diagrams showing one example of the configuration of the shielding plate 31.

Figure 4A:
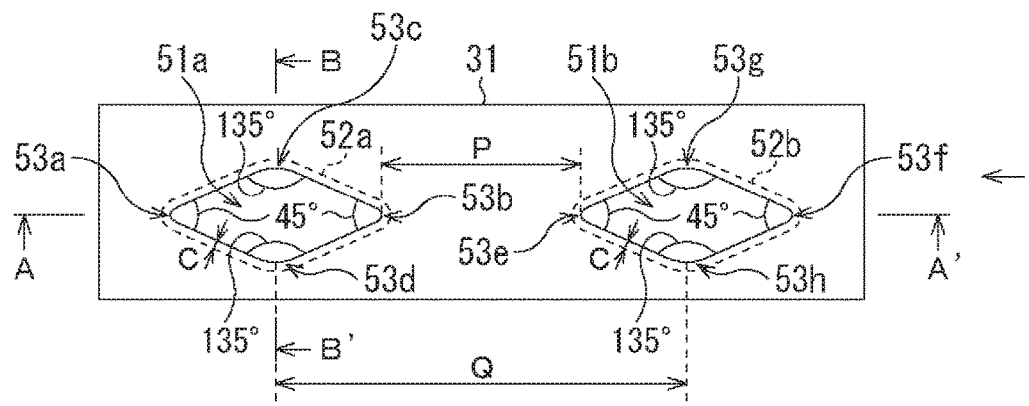
FIG. 4A is a top view showing one example of the configuration of a shielding plate according to the first embodiment.
Figure 4B:
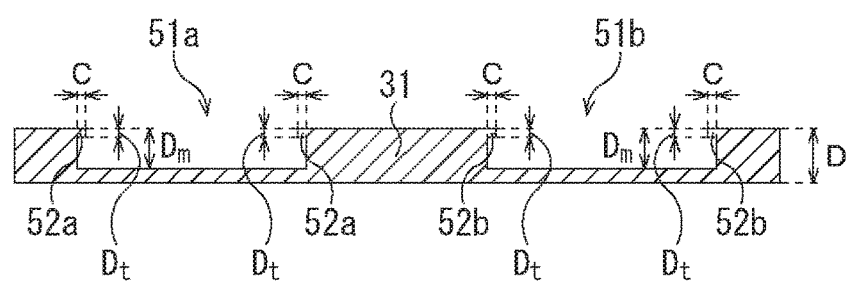
FIG. 4B is a vertical cross-sectional view showing one example of the configuration of the shielding plate according to the first embodiment.
Figure 4C:
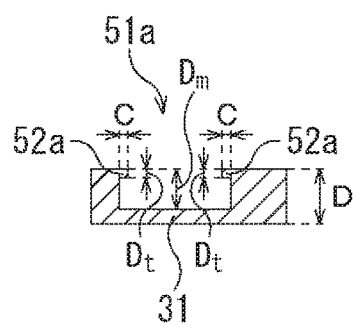
FIG. 4C is a vertical cross-sectional view showing one example of the configuration of the shielding plate according to the first embodiment.
Figure 4D:
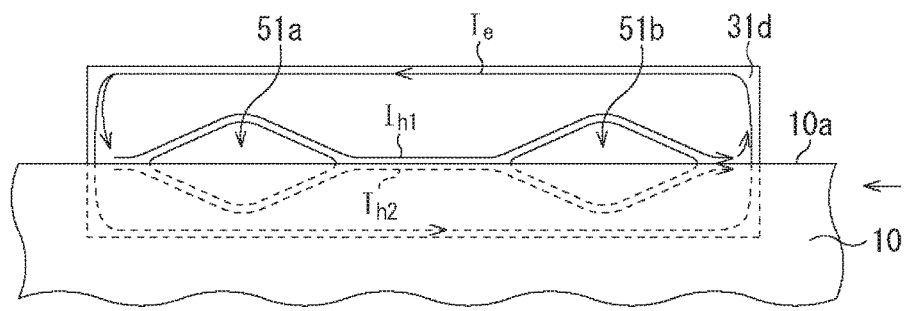
FIG. 4D is a fragmentary view when an area including a shielding plate 31d according to the first embodiment is viewed from directly above a steel strip 10.

Specifically, FIG. 4A is a top view of the shielding plate 31 when viewed from directly above (the steel strip 10 side). Further, FIG. 4B is a vertical cross-sectional view as viewed from the direction of A-A' in FIG. 4A. FIG. 4C is a vertical cross-sectional view as viewed from the direction of B-B' in FIG. 4A. FIG. 4D is a fragmentary view when an area including the shielding plate 31d shown in FIG. 2C is viewed from directly above the steel strip 10. In addition, in FIG. 4D, only a portion which is required to explain the positional relationship between the steel strip 10 and the shielding plate 31d is shown. Further, in FIG. 4D, eddy currents $I_e$, $I_{h1}$, and $I_{h2}$ which flow in the shielding plate 31d are conceptually shown. In addition, the steel strip 10 is conveyed in the direction of an arrow shown in the right end in FIGS. 4A and 4D.

In addition, a conveyance direction of the steel strip 10 approximately corresponds to the depth direction of the shielding plate 31, and a direction (the width direction of the steel strip 10) perpendicular to the conveyance direction of the steel strip 10 on the sheet face approximately corresponds to the width direction of the shielding plate. Further, the plate thickness (the thickness) direction of the shielding plate 31 approximately corresponds to a direction (the sheet thickness direction of the steel strip 10) perpendicular to the coil face of the heating coil (for example, the upper side heating coil 24).

In FIGS. 4A to 4C, the shielding plate 31 is made of copper and has depressed portions 51a and 51b (51) having the same size and shape. The depressed portions 51a and 51b are disposed to have a distance therebetween in the conveyance direction of the steel strip 10.

As shown in FIG. 4A, the shape (the opening shape) in the plate face direction (the plate thickness direction of the shielding plate 31) of each of the depressed portions 51a and 51b is a rhombus in which each of the corner portions 53a to 53h (53) is rounded. In addition, as shown in FIGS. 4A to 4C, at the upper ends of the side surfaces of the depressed portions 51a and 51b, brims (protruded portions) 52a and 52b (52) which protrude toward the insides (the facing side surface sides) of the depressed portions 51a and 51b from the upper ends of the side surfaces are formed along the circumferential directions of the side surfaces.

In FIG. 4A, a distance P between a corner portion which is an end portion of the depressed portion 51a and is on the upstream side in the conveyance direction of the steel strip 10 and a corner portion which is an end portion of the depressed portion 51b and is on the downstream side in the conveyance direction of the steel strip 10 is 150 [mm]. Further, a distance Q between a corner portion which is an end portion of the depressed portion 51a and is located in the center in the conveyance direction of the steel strip 10 and a corner portion which is an end portion of the depressed portion 51b and is located in the center in the conveyance direction of the steel strip 10 is 310 [mm].

As shown in FIG. 4D, in this embodiment, the shielding plate 31 is moved in the width direction of the steel strip 10 such that a side end 10a of the steel strip 10 and the depressed portions 51a and 51b overlap each other when viewed from the up-and-down direction. As a specific example thereof, the side end 10a of the steel strip 10 and the longest portions on the plate face of the depressed portions 51a and 51b (diagonal line portions of the rounded rhombuses parallel to the conveyance direction of the steel strip 10) overlap each other when viewed from the up-and-down direction (a direction perpendicular to the sheet face of the steel strip 10).

By disposing the shielding plate 31 so as to be in such a positional relationship, a main magnetic flux, which is generated by operating the induction heating device 20 and thereby flowing an alternating current in the upper side heating coil 24 and the lower side heating coil 28, can be shielded by the shielding plate 31. However, eddy currents are generated in both side end portions of the steel strip 10 by the main magnetic flux, and the eddy current touches the side end of the steel strip, so that a current density in the side end becomes high and a difference in temperature occurs between the side end and the vicinity thereof. Therefore, the inventors have found from the results of extensive studies that the difference in temperature can be reduced by forming the above-mentioned depressed portions 51a and 51b in the shielding plate 31.

That is, as shown in FIG. 4D, if a portion of the eddy current $I_e$ which flows so as to go around the end portion of the shielding plate 31 is branched so that the eddy currents $I_{h1}$ and $I_{h2}$ flow along the edges of the depressed portions 51a and 51b, an eddy current of the steel strip 10 which is generated by magnetic fields that are created by the eddy currents $I_{h1}$ and $I_{h2}$ cancels out and weakens an eddy current (an eddy current due to the main magnetic flux) which flows in the side end portion of the steel strip 10. As a result, the effect of pushing the eddy current which flows in the side end portion of the steel strip 10 into the inside in the width direction of the steel strip 10 can be produced, so that homogenization of eddy current density in the vicinity of the side end 10a of the steel strip 10 progresses and a difference in temperature between the side end portion (a high-temperature portion) of the steel strip 10 and a portion (a low-temperature portion) further inside than the side end portion is reduced.

Therefore, there is a need to reliably flow the eddy currents $I_{h1}$ and $I_{h2}$ along the edges of the depressed portions formed in the shielding plate. The inventors have obtained knowledge that in the shielding plate with only a depressed portion simply formed therein, there is a possibility that the effect of reducing the above-mentioned difference in temperature cannot be reliably obtained. This is considered to be because an eddy current continuously flows through the bottom surface of the depressed portion. Therefore, the inventors have found that by forming the above-mentioned brims 52a and 52b in the depressed portions 51a and 51b, entry of the eddy currents below the lower sides of the brims 52a and 52b (that is, to the insides of the depressed portions 51a and 51b) can be suppressed. In doing so, the eddy currents which flow in the insides (the bottom surfaces) of the depressed portions 51a and 51b are significantly reduced and the eddy currents $I_{h1}$ and $I_{h2}$ can intensively flow along the edges of the depressed portions 51a and 51b. In particular, it is preferable to form the brims 52a and 52b in the depressed portions 51a and 51b such that the eddy currents do not flow in the insides (the bottom surfaces) of the depressed portions 51a and 51b.

For the reason as described above, in this embodiment, the brims 52a and 52b are formed in the depressed portions 51a and 51b formed in the shielding plate 31.

In FIGS. 4A to 4C, a thickness D of the shielding plate 31 is 25 [mm], a depth $D_m$ of each of the depressed portions 51a and 51b is 15 [mm], a protruding length C of each of the brims 52a and 52b is 5 [mm], and a height (a thickness) $D_t$ of each of the brims 52a and 52b is 5 [mm]. However, these dimensions are not limited to the values described above. Here, since the height (the thickness) $D_t$ of each of the brims 52a and 52b does not significantly contribute to suppression of the above-mentioned entry of the eddy currents, it can be thinned to a thickness which is required for the processing accuracy of the shielding plate 31. Of course, the height (the thickness) $D_t$ of each of the brims 52a and 52b may also be thickened. Further, the protruding length C of each of the brims 52a and 52b can be determined depending on the frequencies of the eddy currents $I_{h1}$ and $I_{h2}$ which flow in the shielding plate 31 (if the frequencies of the eddy currents $I_{h1}$ and $I_{h2}$ which flow in the shielding plate 31 are high, the protruding length C of each of the brims 52a and 52b may be lengthened). The inventors have confirmed that in a frequency range (5 [kHz] to 10 [kHz]) which is used in the induction heating device 20, if the protruding length C of each of the brims 52a and 52b is 1 [mm] or more, in a case where the brims 52a and 52b are formed and a case where the brims 52a and 52b are not formed, a sufficient difference occurs in the effect of reducing the above-mentioned difference in temperature.

Further, as described above, in this embodiment, the corner portions 53a to 53h of the depressed portions 51a and 51b are rounded. In this case, it is preferable that at least the corner portions 53a and 53e which are the "corner portions on the downstream side in the conveyance direction of the steel strip 10" of the depressed portions 51a and 51b be rounded so as to protrude in the downstream side direction and the corner portions 53b and 53f which are the "corner portions on the upstream side in the conveyance direction of the steel strip 10" of the depressed portions 51a and 51b be rounded so as to protrude in the upstream side direction. In doing so, even if the steel strip 10 moves in a meandering manner, it is possible to reduce the amount of change in the ""overlap length in the conveyance direction of the steel strip 10" between the side end 10a of the steel strip and each of the depressed portions 51a and 51b" when viewed from the up-and-down direction. Further, as described above, by forming the brims 52a and 52b in the depressed portions 51a and 51b, the eddy currents $I_{h1}$ and $I_{h2}$ can intensively flow along the edges of the depressed portions 51a and 51b, so that even if the steel strip 10 moves in a meandering manner, reduction of a repulsive force which is generated between the eddy currents $I_{h1}$ and $I_{h2}$ and the eddy current which flows through the side end portion of the steel strip 10 can be suppressed. Therefore, even if the steel strip 10 moves in a meandering manner, a change in the temperature distribution in the width direction of the steel strip 10 can be reduced.

[Summary]

As described above, in this embodiment, the shielding plate 31 is disposed between the side end portion of the steel strip 10 and each of the cores 23 and 27 (the upper side heating coil 24 and the lower side heating coil 28). In the shielding plate 31, the two depressed portions 51a and 51b are formed so as to have a distance therebetween in the conveyance direction of the steel strip 10. In addition, at the upper ends of the side surfaces of the depressed portions 51a and 51b, the brims 52a and 52b which protrude toward the insides of the depressed portions 51a and 51b from the upper ends of the side surfaces are formed along the circumferential directions of the side surfaces. Therefore, it becomes difficult for the eddy current which flow through the shielding plate 31 to enter below the lower sides of the brims 52a and 52b. Further, entry of the eddy current into the lower sides of the brims 52a and 52b can also be completely prevented. Accordingly, the eddy currents which flow in the insides (the bottom surfaces) of the depressed portions 51a and 51b are significantly reduced and the eddy currents $I_{h1}$ and $I_{h2}$ can intensively flow along the edges of the depressed portions 51a and 51b. As a result, the smoothing of the temperature distribution in the width direction of the steel strip 10 can be realized. Further, in this manner, the eddy currents $I_{h1}$ and $I_{h2}$ can intensively flow along the edges (that is, areas including the brims 52a and 52b) of the depressed portions 51a and 51b, whereby even if the steel strip 10 moves in a meandering manner, the effect in which the eddy currents $I_{h1}$ and $I_{h2}$ push the eddy current flowing in the side end portion of the steel strip 10 further into the inside than the side end portion can be maintained to some extent. Accordingly, even if the steel strip 10 moves in a meandering manner, a change in the temperature distribution in the width direction of the steel strip 10 can be reduced. In addition, even in a case where the steel strip 10 moves in a meandering manner, a magnetic field which is generated by the eddy current flowing in the shielding plate 31d pushes the side end of the steel strip 10 back to the center side in the width direction of the steel strip 10, so that meandering of the steel strip 10 can be suppressed.

Further, in this embodiment, the corner portions 53a and 53e which are the "corner portions on the downstream side in the conveyance direction of the steel strip 10" of the depressed portions 51a and 51b are rounded so as to protrude in the downstream side direction and the corner portions 53b and 53f which are the "corner portions on the upstream side in the conveyance direction of the steel strip 10" of the depressed portions 51a and 51b are rounded so as to protrude in the upstream side direction. Therefore, even if the steel strip 10 moves in a meandering manner, it is possible to reduce the amount of change in the ""overlap length in the conveyance direction of the steel strip 10" between the side end 10a of the steel strip and each of the depressed portions 51a and 51b" when viewed from the up-and-down direction, so that the amount of change in the push-in effect of the eddy current flowing in the side end portion of the steel strip 10 can also be reduced. Accordingly, a change in the temperature distribution in the width direction of the steel strip 10 when the steel strip 10 moves in a meandering manner can be even further reduced.

Modified Examples

<Shielding Plate>

Figure 5A:
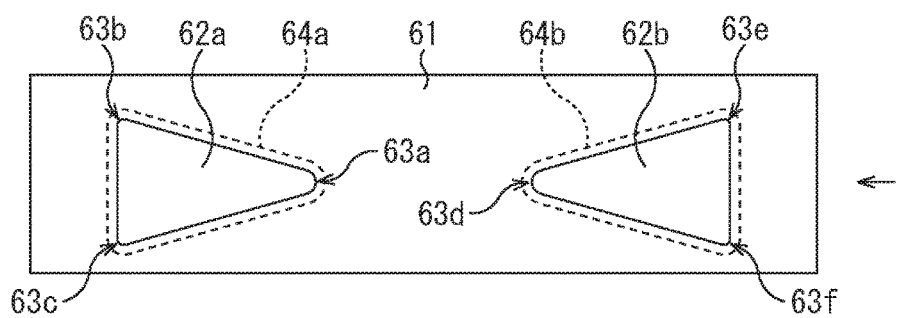
FIG. 5A is a top view showing one example of the configuration of a shielding plate according to a first modified example of the first embodiment.
Figure 5B:
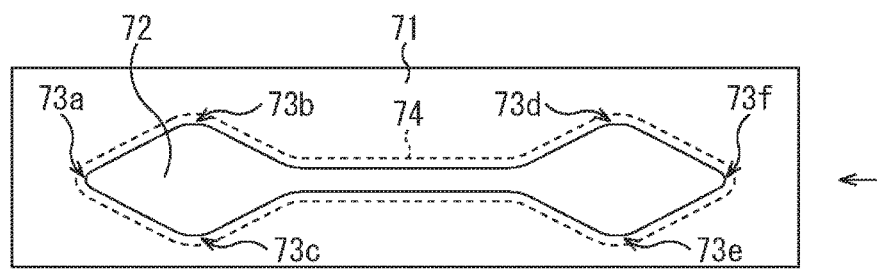
FIG. 5B is a top view showing one example of the configuration of a shielding plate according to a second modified example of the first embodiment.
Figure 5C:
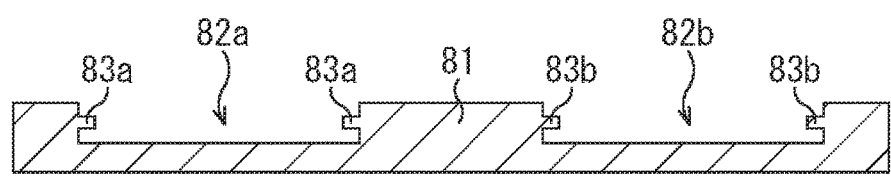
FIG. 5C is a vertical cross-sectional view showing one example of the configuration of a shielding plate according to a third modified example of the first embodiment.

FIGS. 5A to 5C are diagrams showing modified examples of the configuration of the shielding plate. FIGS. 5A and 5B respectively show the first and the second modified examples of the shielding plate and are diagrams showing the shielding plate when viewed from directly above (from the steel strip 10 side). These drawings correspond to FIG. 4A.

In FIG. 5A, a shielding plate 61 is made of copper and has depressed portions 62a and 62b (62) disposed to have a distance therebetween in the conveyance direction of the steel strip 10 and having the same size and shape. In these points, the shielding plate 61 is the same as the shielding plate 31 shown in FIGS. 4A to 4C. However, as shown in FIG. 5A, the shape (the opening shape) in the plate face direction of the depressed portion 62a is a triangle which is tapered off toward the upstream side from the downstream side in the conveyance direction (a direction of an arrow shown in FIGS. 5A and 5B) of the steel strip 10 and in which the corner portions 63a to 63c (63) are rounded. In such a case, it is preferable that at least the corner portion 63a which is the "corner portion on the upstream side in the conveyance direction of the steel strip 10" of the depressed portion 62a be rounded so as to protrude in the upstream side direction.

Further, the shape (the opening shape) in the plate face direction of the depressed portion 62b is a triangle which is tapered off toward the downstream side from the upstream side in the conveyance direction of the steel strip 10 and in which the corner portions 63d to 63f (63) are rounded. In such a case, it is preferable that at least the corner portion 63d which is the "corner portion on the downstream side in the conveyance direction of the steel strip 10" of the depressed portion 62b be rounded so as to protrude in the downstream side direction.

Further, brims 64a and 64b as described above are formed at the upper ends of the side surfaces of the depressed portions 62a and 62b.

Further, in FIG. 5B, a shielding plate 71 is made of copper. As shown in FIG. 5B, the number of depressed portions 72 which are formed in the shielding plate 71 is 1. As shown in FIG. 5B, the shape in the plate face direction of the depressed portion 72 is a shape in which the "corner portion (the corner portion 53b) on the upstream side in the conveyance direction of the steel strip 10" of the depressed portion 51a shown in FIGS. 4A to 4C and the "corner portion (the corner portion 53e) on the downstream side in the conveyance direction of the steel strip 10" of the depressed portion 51b are connected to each other, and the corner portions 73a to 73f (73) are rounded. Further, it is preferable that at least the corner portion 73f which becomes the "corner portion on the upstream side in the conveyance direction of the steel strip 10" of the depressed portion 72 be rounded so as to protrude in the upstream side direction. In addition, the corner portion 73a which becomes the "corner portion on the downstream side in the conveyance direction of the steel strip 10" of the depressed portion 72 may also be rounded so as to protrude in the downstream side direction. Further, a brim 74 as described above is formed at the upper end of the side surface of the depressed portion 72.

As described above, it is preferable that a portion (a second portion) which is tapered off toward the upstream side from the downstream side in the conveyance direction of the steel strip 10 and a portion (a first portion) which is tapered off toward the downstream side from the upstream side in the conveyance direction of the steel strip 10 be included in the depressed portion which is formed in the shielding plate. The first portion and the second portion may also be formed individually (FIGS. 4A, 5A, 5C, and 5D) and may also be formed integrally (FIG. 5B). In addition, it is preferable that the tapered first and second portions face each other in the conveyance direction of the steel strip 10. If the shape in the plate face direction of the depressed portion is such a shape, it becomes possible to form the edge of the depressed portion of the shielding plate according to a pathway of the eddy current flowing through the steel strip 10. Further, in this case, it is preferable that at least the tapered end portion (the tapered portion) among the "corner portions on the upstream side and the downstream side in the conveyance direction of the steel strip 10" of the depressed portion be rounded.

In addition, the shape (the opening shape) in the plate face direction of the depressed portion which is formed in the shielding plate may also be any shape (for example, a single triangle) and the number thereof may be 1 and may also be 2 or more.

Further, it is preferable that a portion (a third portion) which is tapered off toward a side close to the central portion in the width direction (a direction perpendicular to the conveyance direction) of the conductive sheet from a side away from the central portion in the width direction of the conductive sheet be included in the depressed portion. In this case, it is possible to gradually increase the amount of change in the effect in which the magnetic field that is generated by the eddy current flowing in the shielding plate pushes the side end of the steel strip into the center side in the width direction of the steel strip, so that suppression of meandering of the conductive sheet can be more flexibly controlled. For example, in FIG. 4A, two third portions are included in the two depressed portions 51a and 51b of the shielding plate 31. In addition, it is also acceptable that only a single depressed portion is formed in the shielding plate and the third portion is included in the single depressed portion. However, if a plurality of third portions is included in the depressed portion of the shielding plate, it is possible to more uniformly produce the above-mentioned push-in effect. Further, a portion (a fourth portion) which is tapered off toward a side away from the central portion in the width direction of the conductive sheet from a side close to the central portion in the width direction of the conductive sheet may also be included.

Figure 5D:
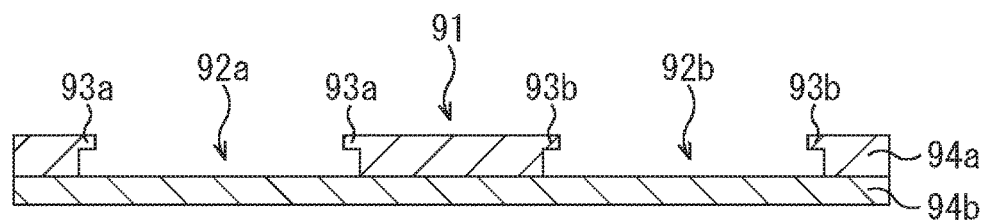
FIG. 5D is a vertical cross-sectional view showing one example of the configuration of a shielding plate according to a fourth modified example of the first embodiment.

FIGS. 5C and 5D respectively show the third and the fourth modified examples of the shielding plate and are vertical cross-sectional views when the shielding plate is cut in the thickness direction of the shielding plate along the conveyance direction of the steel strip 10. These drawings correspond to FIG. 4B.

In FIG. 5C, a shielding plate 81 is made of copper and has depressed portions 82a and 82b (82) disposed to have a distance therebetween in the conveyance direction of the steel strip 10 and having the same size and shape. Further, the shape (the opening shape) in the plate face direction of each of the depressed portions 82a and 82b is a rhombus in which each of the corner portions is rounded. With respect to this, the shielding plate in FIG. 5C and the shielding plate 31 shown in FIG. 4A are the same. However, as shown in FIG. 5C, brims 83a and 83b are formed at intermediate portions of the side surfaces of the depressed portions 82a and 82b, rather than the upper ends of the side surfaces of the depressed portions 82a and 82b.

As described above, the brim (having the upper surface and the lower surface) may be formed on the side surface of the depressed portion along the circumferential direction of the side surface of the depressed portion so as to protrude toward the inside of the depressed portion from the side surface.

Further, in FIG. 5D, a shielding plate 91 is made of copper and has depressed portions 92a and 92b (92) disposed to have a distance therebetween in the conveyance direction of the steel strip 10 and having the same size and shape. Further, the shape (the opening shape) in the plate face direction of each of the depressed portions 92a and 92b is a rhombus in which each of the corner portions is rounded. In addition, at the upper ends of the side surfaces of the depressed portions 92a and 92b, brims 93a and 93b (93) which protrude toward the insides of the depressed portions 92a and 92b from the upper ends of the side surfaces are formed along the circumferential directions of the side surfaces. In this manner, the shielding plate 91 shown in FIG. 5D and the shielding plate 31 shown in FIG. 4A are the same in material, shape, and size. However, the shielding plate 91 shown in FIG. 5D is formed by superimposing an upper plate 94a and a lower plate 94b on each other and fixing them to each other.

As described above, the shielding plate may also be integrally formed and may also be formed by combining a plurality of members.

Besides, although in this embodiment, the shielding plate is made of copper, the shielding plate is not limited to a copper plate. That is, provided that the shielding plate is a conductor, preferably, a conductor having relative permeability of 1, the shielding plate may also be formed of any material. For example, the shielding plate can be formed of aluminum.

Other modified examples will be described. FIGS. 8A to 12C respectively show the fifth to the thirty-third modified examples of the shielding plate and are vertical cross-sectional views when the shielding plate is cut in the thickness direction of the shielding plate along the conveyance direction of the steel strip 10.

In FIGS. 8A to 8H, a protruded portion is formed along an edge of a depressed portion, and the protruded portion extends in the direction of the conductive sheet from the upper surface of the shielding plate, which faces the side end portion of the conductive sheet.

Figure 8A:
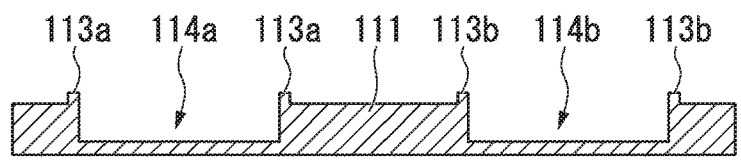
FIG. 8A is a vertical cross-sectional view showing one example of the configuration of a shielding plate according to a fifth modified example of the first embodiment.
Figure 8B:
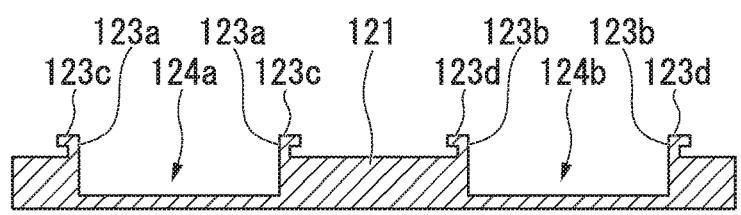
FIG. 8B is a vertical cross-sectional view showing one example of the configuration of a shielding plate according to a sixth modified example of the first embodiment.
Figure 8C:
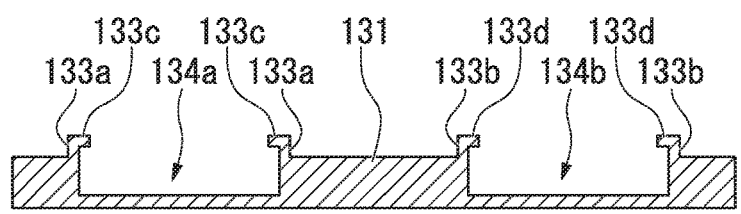
FIG. 8C is a vertical cross-sectional view showing one example of the configuration of a shielding plate according to a seventh modified example of the first embodiment.
Figure 8D:
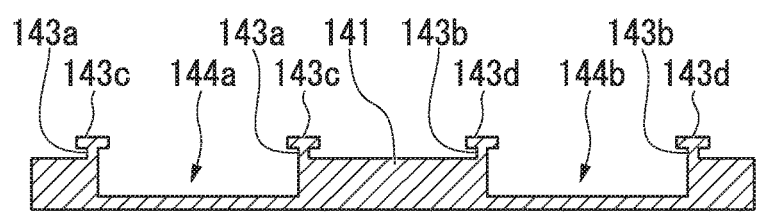
FIG. 8D is a vertical cross-sectional view showing one example of the configuration of a shielding plate according to an eighth modified example of the first embodiment.
Figure 8E:
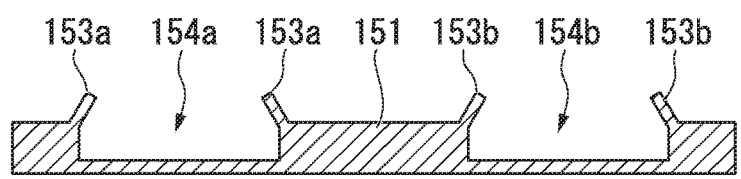
FIG. 8E is a vertical cross-sectional view showing one example of the configuration of a shielding plate according to a ninth modified example of the first embodiment.
Figure 8F:
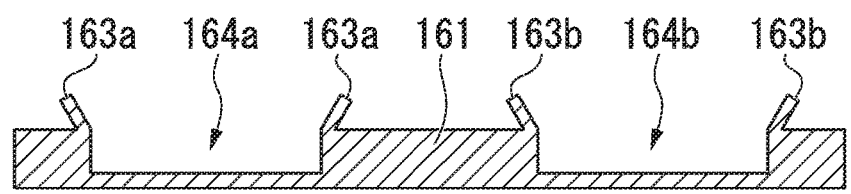
FIG. 8F is a vertical cross-sectional view showing one example of the configuration of a shielding plate according to a tenth modified example of the first embodiment.
Figure 8G:
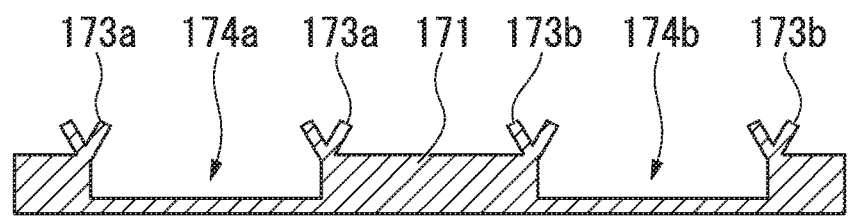
FIG. 8G is a vertical cross-sectional view showing one example of the configuration of a shielding plate according to an eleventh modified example of the first embodiment.
Figure 8H:
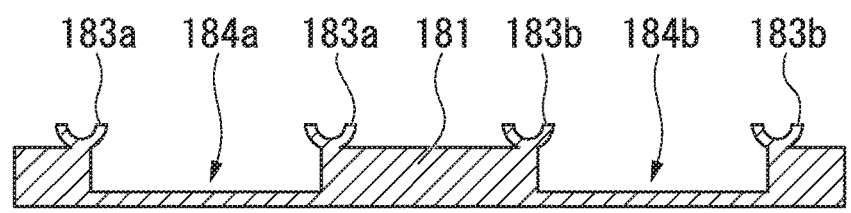
FIG. 8H is a vertical cross-sectional view showing one example of the configuration of a shielding plate according to a twelfth modified example of the first embodiment.

In the fifth modified example of this embodiment shown in FIG. 8A, protruded portions 113a and 113b (113) are formed which extend in the thickness direction of a shielding plate from edge portions following edges of depressed portions 114a and 114b (114) of a shielding plate 111 in the upper surface of the shielding plate 111, which faces the side end portion of the conductive sheet. Further, in the sixth modified example of this embodiment shown in FIG. 8B, first protruded portions 123a and 123b (123) are formed which extend in the thickness direction of a shielding plate from edge portions following edges of depressed portions 124a and 124b (124) of a shielding plate 121 in the upper surface of the shielding plate 121. In addition, second protruded portions 123c and 123d (123) are formed which extend toward the outside of a closed line (hereinafter referred to as a closed loop) which is formed by the first protruded portions 123a and 123b, from front ends of the first protruded portions 123a and 123b. In the seventh modified example of this embodiment shown in FIG. 8C, first protruded portions 133a and 133b (133) are formed which extend in the thickness direction of a shielding plate from edge portions following edges of depressed portions 134a and 134b (134) of a shielding plate 131 in the upper surface of the shielding plate 131. In addition, second protruded portions 133c and 133d (133) are formed which extend toward the inside of a closed loop which is formed by the first protruded portions 133a and 133b, from the front ends of the first protruded portions 133a and 133b (133). In the eighth modified example of this embodiment shown in FIG. 8D, first protruded portions 143a and 143b (143) are formed which extend in the thickness direction of a shielding plate from edge portions following edges of depressed portions 144a and 144b (144) of a shielding plate 141 in the upper surface of the shielding plate 141. In addition, second protruded portions 143c and 143d (143) are formed which extend toward both the inside and the outside of a closed loop which is formed by the first protruded portions 143a and 143b, from front ends of the first protruded portions 143a and 143b. In the ninth modified example of this embodiment shown in FIG. 8E, protruded portions 153a and 153b (153) are formed which extend toward a direction tilted the thickness direction of a shielding plate 151 toward the insides of depressed portions 154a and 154b, from edge portions following edges of the depressed portions 154a and 154b (154) of the shielding plate 151. In the tenth modified example of this embodiment shown in FIG. 8F, protruded portions 163a and 163b (163) are formed which extend toward a direction tilted the thickness direction of a shielding plate 161 toward the outsides of depressed portions 164a and 164b, from edge portions following edges of the depressed portions 164a and 164b (164) of the shielding plate 161. In the eleventh modified example of this embodiment shown in FIG. 8G, protruded portions 173a and 173b (173) are formed which extend toward directions tilted the thickness direction of a shielding plate 171 toward the inside and the outsides of depressed portions 174a and 174b, from edge portions following edges of the depressed portions 174a and 174b (174) of the shielding plate 171. In the twelfth modified example of this embodiment shown in FIG. 8H, curved protruded portions 183a and 183b (183) are formed which extend toward directions tilted the thickness direction of a shielding plate 181 toward the inside and the outsides of depressed portions 184a and 184b, from edge portions following edges of the depressed portions 184a and 184b (184) of the shielding plate 181. For example, conductive members made by cutting pipes in the longitudinal direction thereof can be used for the protruded portions 183a and 183b. In addition, in the fifth to the twelfth modified examples shown in FIGS. 8A to 8H, a depressed portion (a thin thickness portion of the shielding plate) need not be necessarily formed in the shielding plate, and it is acceptable if a depressed portion is formed on the shielding plate using a protruded portion.

In FIGS. 9A to 9E and 10A to 10D, protruded portions are formed which extend along the side surfaces of depressed portions toward the insides (the facing side surface sides) of the depressed portions from the side surfaces.

Figure 9A:
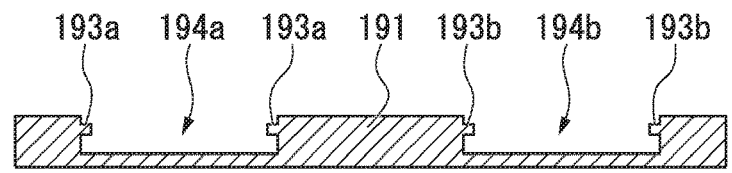
FIG. 9A is a vertical cross-sectional view showing one example of the configuration of a shielding plate according to a thirteenth modified example of the first embodiment.
Figure 9B:
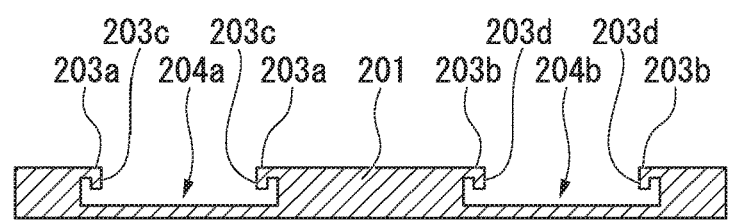
FIG. 9B is a vertical cross-sectional view showing one example of the configuration of a shielding plate according to a fourteenth modified example of the first embodiment.
Figure 9C:
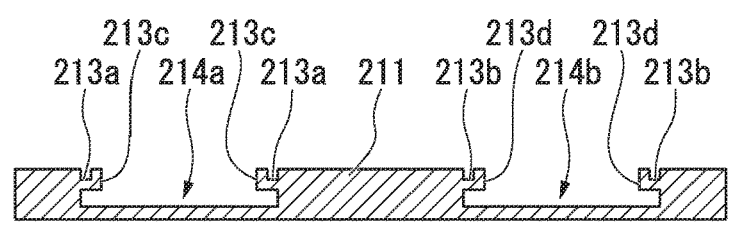
FIG. 9C is a vertical cross-sectional view showing one example of the configuration of a shielding plate according to a fifteenth modified example of the first embodiment.
Figure 9D:
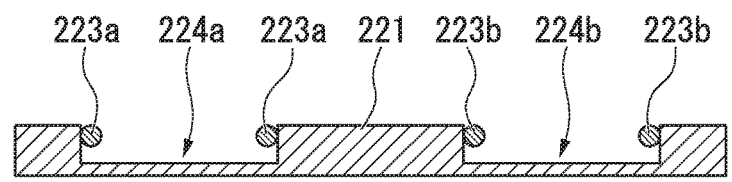
FIG. 9D is a vertical cross-sectional view showing one example of the configuration of a shielding plate according to a sixteenth modified example of the first embodiment.
Figure 9E:
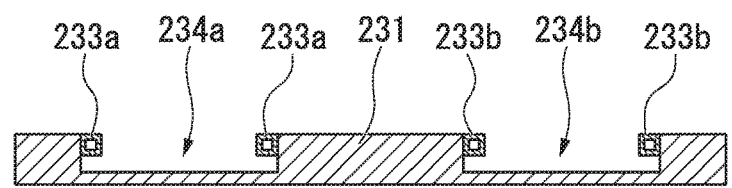
FIG. 9E is a vertical cross-sectional view showing one example of the configuration of a shielding plate according to a seventeenth modified example of the first embodiment.

In the thirteenth modified example shown in FIG. 9A, each of the protruded portions 193a and 193b (193) which extend toward the insides of depressed portions 194a and 194b is formed between an upper end (an opening end) and a lower end (a closed end) of the side surface of each of the depressed portions 194a and 194b (194) of a shielding plate 191. In the thirteenth modified example, the protruded portion in the third modified example described above is shifted to the opening portion side. In the fourteenth modified example shown in FIG. 9B, first protruded portions 203a and 203b (203) which extend toward the insides of depressed portions 204a and 204b from the side surfaces (upper ends of the side surfaces) of the depressed portions 204a and 204b (204) of a shielding plate 201 and second protruded portions 203c and 203d (203) which extend toward the bottom surfaces (the thickness direction of the shielding plate) of the depressed portions 204a and 204b from the first protruded portions 203a and 203b are formed. In the fifteenth modified example shown in FIG. 9C, first protruded portions 213a and 213b (213) which extend toward the insides of depressed portions 214a and 214b from the side surfaces of the depressed portions 214a and 214b (214) of a shielding plate 211 (from between an upper end and a lower end of the side surface of each of the depressed portions 214a and 214b) and second protruded portions 213c and 213d (213) which extend toward the opening faces (the thickness direction of the shielding plate 211) of the depressed portions 214a and 214b from the first protruded portions 213a and 213b are formed. In addition, in the fifteenth modified example, the front end faces of the second protruded portions 213c and 213d (213) are included in the same surface as the upper surface of the shielding plate 211. In the fourteenth and the fifteenth modified examples, the forming position of the first protruded portion may also be any position between the upper end and the lower end of the side surface of the depressed portion, provided that the first protruded portion and the second protruded portion do not come into contact with the bottom surface of the depressed portion. Further, in these cases, the extending direction of the second protruded portion may also be tilted from the thickness direction of the shielding plate, similarly to the ninth and the tenth modified examples, and a plurality of the second protruded portion may also be formed, similarly to the eleventh modified example. Further, in the sixteenth modified example shown in FIG. 9D, each of the conductive round members 223a and 223b (223) is disposed between an upper end and a lower end of the side surface of each of the depressed portions 224a and 224b (224) of a shielding plate 221. Each of the round members 223a and 223b may also be a solid round bar and may also be a hollow pipe. In the seventeenth modified example shown in FIG. 9E, conductive square pipes 233a and 233b (233) are disposed at the side surfaces (upper ends of the side surfaces) of depressed portions 234a and 234b (234) of a shielding plate 231. In addition, the disposition position of each of the round member and the square pipe in the sixteenth and the seventeenth modified examples may also be any position between the upper end and the lower end of the side surface of the depressed portion, provided that the round member and the square pipe do not come into contact with the bottom surface of the depressed portion. Each of the round member and the square pipe acts as the protruded portion and can be fixed to the shielding plate by welding or adhesion.

Figure 10A:
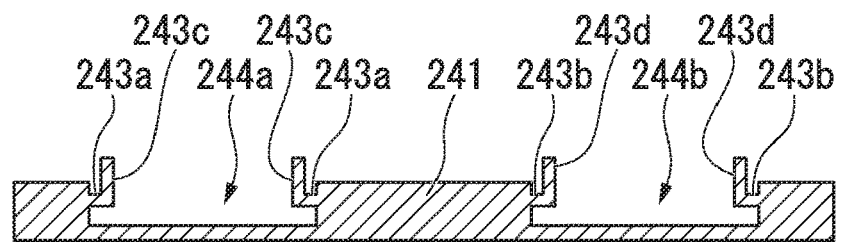
FIG. 10A is a vertical cross-sectional view showing one example of the configuration of a shielding plate according to an eighteenth modified example of the first embodiment.
Figure 10B:
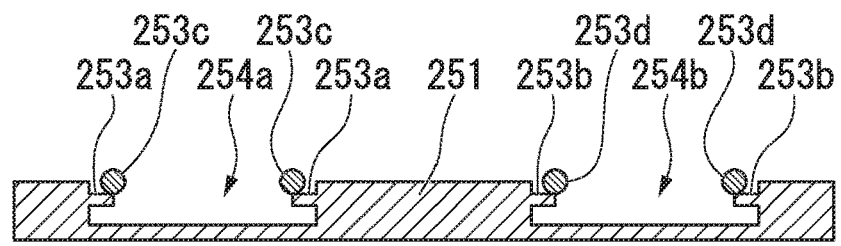
FIG. 10B is a vertical cross-sectional view showing one example of the configuration of a shielding plate according to a nineteenth modified example of the first embodiment.
Figure 10C:
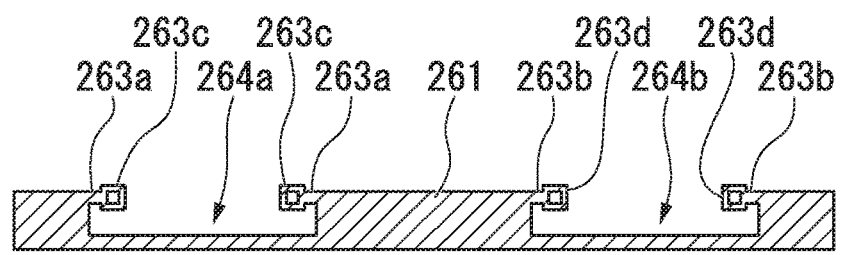
FIG. 10C is a vertical cross-sectional view showing one example of the configuration of a shielding plate according to a twentieth modified example of the first embodiment.
Figure 10D:
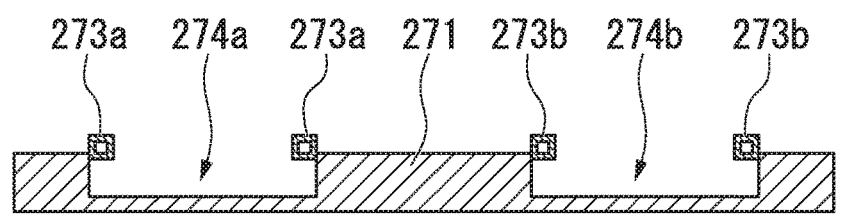
FIG. 10D is a vertical cross-sectional view showing one example of the configuration of a shielding plate according to a twenty-first modified example of the first embodiment.

In the eighteenth modified example shown in FIG. 10A, first protruded portions 243a and 243b (243) which extend toward the insides of depressed portions 244a and 244b from the side surfaces of the depressed portions 244a and 244b (244) of a shielding plate 241 (from between an upper end and a lower end of the side surface of each of the depressed portions 244a and 244b) and second protruded portions 243c and 243d which extend toward the opening faces (the thickness direction of the shielding plate) of the depressed portions 244a and 244b from the first protruded portions 243a and 243b are formed. In this manner, the second protruded portions 243c and 243d may also protrude to the outsides of the depressed portions 244a and 244b (the opening faces of the depressed portions 244a and 244b), and the length in the extending direction of each of the second protruded portions 243c and 243d is not particularly limited. In the nineteenth modified example shown in FIG. 10B, protruded portions 253a and 253b (253) are formed which extend toward the insides of depressed portions 254a and 254b from the side surfaces of the depressed portions 254a and 254b (254) of a shielding plate 251 (from between an upper end and a lower end of the side surface of each of the depressed portions 254a and 254b), and each of conductive round members 253c and 253d (253) is disposed on the side surface on the opening face side of each of the protruded portions 253a and 253b (between a front end and a base end of the side surface). In the twentieth modified example shown in FIG. 10C, protruded portions 263a and 263b (263) are formed which extend toward the insides of depressed portions 264a and 264b from the side surfaces (upper ends of the side surfaces) of the depressed portions 264a and 264b (264) of a shielding plate 261, and conductive square members 263c and 263d (263) are disposed at front ends of the protruded portions 263a and 263b. In the nineteenth and the twentieth modified examples, each of the round member and the square member protrudes to the outside of the depressed portion (the opening face of the depressed portion). Further, in these cases, each of the round member and the square member may also be a solid bar (a solid round bar or a solid square bar) and may also be a hollow pipe (a round pipe or a square pipe). In addition as in the twenty-first modified example shown in FIG. 10D, conductive square members 273a and 273b (273) may also be directly disposed on the side surfaces of depressed portions 274a and 274b (274) of a shielding plate 271. Each of the round member and the square member acts as the protruded portion (the protruded portion) and can be fixed to the shielding plate by welding or adhesion.

In FIGS. 11A to 11I, conductive protrusion members (protruded portions) are disposed on the upper surface of a shielding plate so as to represent a closed loop on the upper surface of the shielding plate.

Figure 11A:
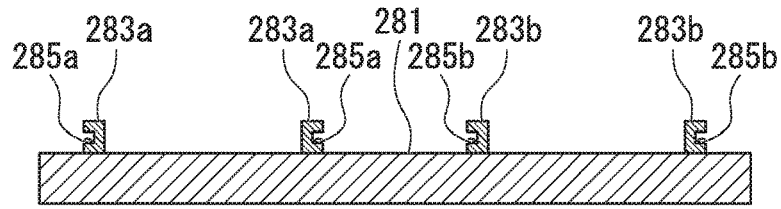
FIG. 11A is a vertical cross-sectional view showing one example of the configuration of a shielding plate according to a twenty-second modified example of the first embodiment.
Figure 11B:
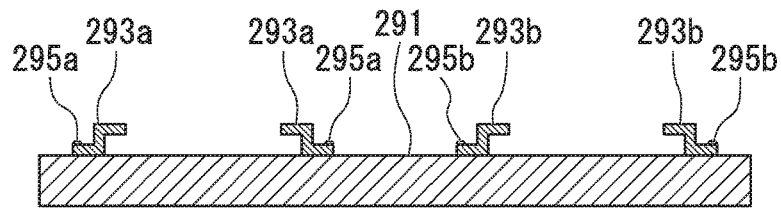
FIG. 11B is a vertical cross-sectional view showing one example of the configuration of a shielding plate according to a twenty-third modified example of the first embodiment.
Figure 11C:
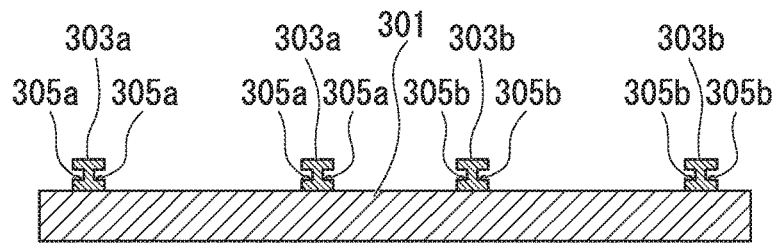
FIG. 11C is a vertical cross-sectional view showing one example of the configuration of a shielding plate according to a twenty-fourth modified example of the first embodiment.
Figure 11D:
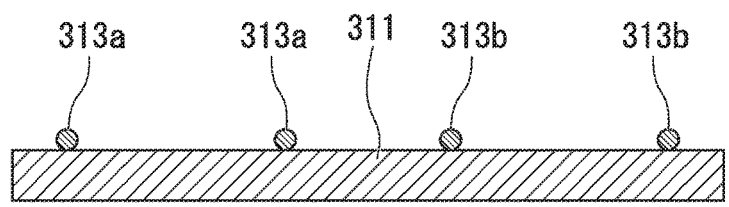
FIG. 11D is a vertical cross-sectional view showing one example of the configuration of a shielding plate according to a twenty-fifth modified example of the first embodiment.
Figure 11E:
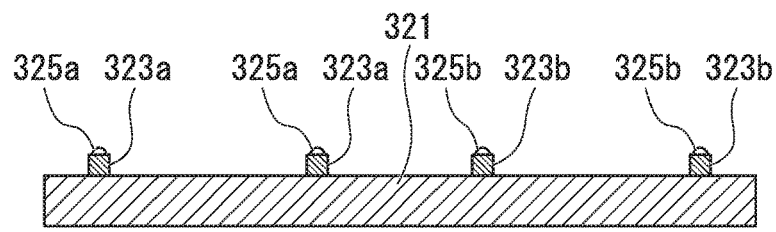
FIG. 11E is a vertical cross-sectional view showing one example of the configuration of a shielding plate according to a twenty-sixth modified example of the first embodiment.
Figure 11F:
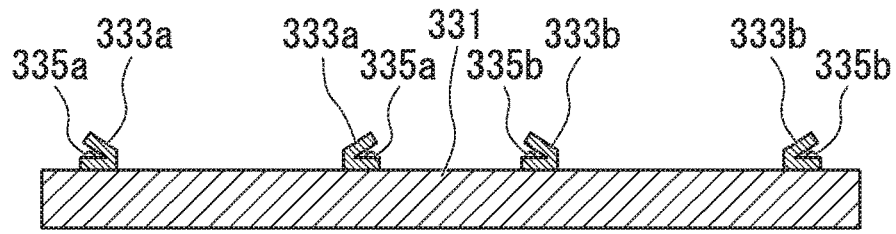
FIG. 11F is a vertical cross-sectional view showing one example of the configuration of a shielding plate according to a twenty-seventh modified example of the first embodiment.
Figure 11G:
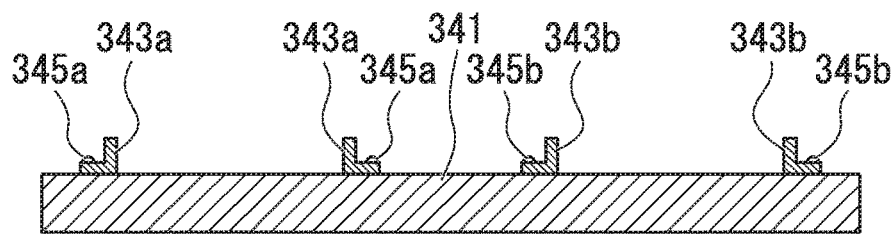
FIG. 11G is a vertical cross-sectional view showing one example of the configuration of a shielding plate according to a twenty-eighth modified example of the first embodiment.
Figure 11H:
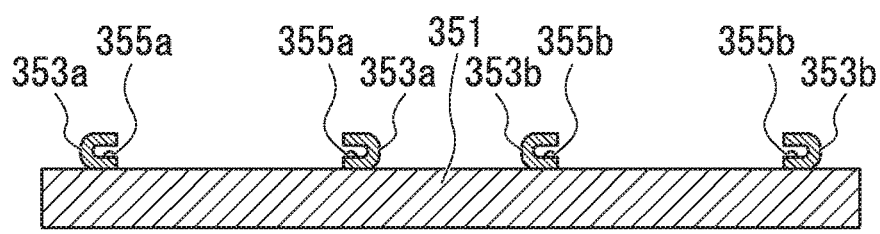
FIG. 11H is a vertical cross-sectional view showing one example of the configuration of a shielding plate according to a twenty-ninth modified example of the first embodiment.
Figure 11I:
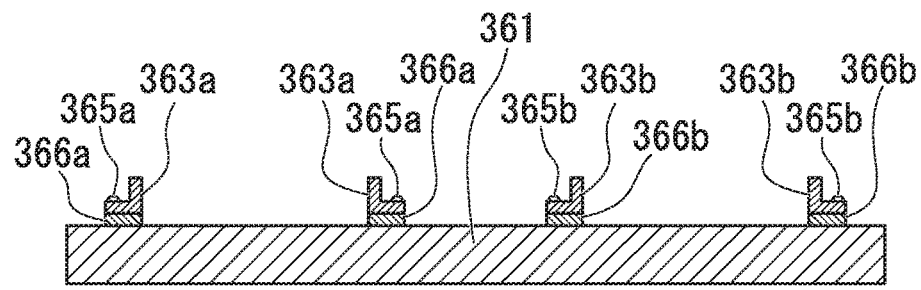
FIG. 11I is a vertical cross-sectional view showing one example of the configuration of a shielding plate according to a thirtieth modified example of the first embodiment.

In the twenty-second modified example shown in FIG. 11A, U-shaped conductive members 283a and 283b (283) are connected to the upper surface of a shielding plate 281 by bolts 285a and 285b (285) so as to represent a closed loop on the upper surface of the shielding plate 281. Further, in the twenty-third modified example shown in FIG. 11B, Z-shaped conductive members 293a and 293b (293) are connected to the upper surface of a shielding plate 291 by bolts 295a and 295b (295) so as to represent a closed loop on the upper surface of the shielding plate 291. In the twenty-fourth modified example shown in FIG. 11C, H-shaped conductive members 303a and 303b (303) are connected to the upper surface of a shielding plate 301 by bolts 305a and 305b (305) so as to represent a closed loop on the upper surface of the shielding plate 301. In the twenty-fifth modified example shown in FIG. 11D, conductive round members 313a and 313b (313) are disposed on the upper surface of a shielding plate 311 so as to represent a closed loop on the upper surface of the shielding plate 311. In the twenty-sixth modified example shown in FIG. 11E, conductive square members 323a and 323b are connected to the upper surface of a shielding plate 321 by bolts 325a and 325b (325) so as to represent a closed loop on the upper surface of the shielding plate 321. In the twenty-fifth and the twenty-sixth modified examples, each of the round member and the square member may also be a solid bar (a solid round bar or a solid square bar) and may also be a hollow pipe (a round pipe or a square pipe). In the twenty-seventh modified example shown in FIG. 11F, V-shaped conductive members 333a and 333b (333) are connected to the upper surface of a shielding plate 331 by bolts 335a and 335b (335) so as to represent a closed loop on the upper surface of the shielding plate 331. In the twenty-eighth modified example shown in FIG. 11G, L-shaped conductive members 343a and 343b (343) are connected to the upper surface of a shielding plate 341 by bolts 345a and 345b (345) so as to represent a closed loop on the upper surface of the shielding plate 341. In the twenty-ninth modified example shown in FIG. 11H, conductive members 353a and 353b (353) having curvature are connected to the upper surface of a shielding plate 351 by bolts 355a and 355b (355) so as to represent a closed loop on the upper surface of the shielding plate 351. For example, a conductive member made by cutting a pipe in the longitudinal direction thereof can be used for each of the conductive members 353a and 353b having curvature. In addition, each member in the twenty-second, the twenty-third, the twenty-fourth, the twenty-seventh, and the twenty-eighth modified examples may also have curvature. Further, in the twenty-second, the twenty-seventh, and the twenty-ninth modified examples, an opening portion of each member is present outside the closed loop. However, the opening portion may also be present inside the closed loop. In addition, in the twenty-second to the twenty-ninth modified examples, each conductive member is fixed to the shielding plate using the bolt. However, both a metallic bolt and a non-metallic bolt can be used and each conductive member may also be fixed to the shielding plate by welding or adhesion. In the thirtieth modified example shown in FIG. 11I, non-magnetic insulating materials 366a and 366b (366) are disposed on the upper surface of a shielding plate 361 so as to represent a closed loop on the upper surface of the shielding plate 361 and L-shaped conductive members 363a and 363b (363) are disposed on the surfaces of the non-magnetic insulating materials 366a and 366b, which represent a closed loop. Further, the shielding plate 361, the non-magnetic insulating materials 366a and 366b, and the L-shaped conductive members 363a and 363b are connected to each other by insulating bolts (bolts) 365a and 365b. In this manner, by using the non-magnetic insulating materials 366a and 366b, an eddy current independent of an eddy current of the main body of the shielding plate can be secured in the conductive member. In addition, the non-magnetic insulating material can be applied to the twenty-second to the twenty-ninth modified examples. Further, the non-magnetic insulating material may also be disposed so as to cover the entirety of the upper surface of the shielding plate. Further, in the case of using the non-magnetic insulating material, it is preferable to fix the non-magnetic insulating material and the conductive member to the shielding plate using an insulating bolt. In addition, in the twenty-second to the thirtieth modified examples, a depressed portion is not formed in the main body of the shielding plate. However, it is also acceptable that a depressed portion is formed in the main body of the shielding plate and each conductive member is then disposed along an edge of the depressed portion.

In addition, in the sixteenth, the seventeenth, the nineteenth, the twentieth, the twenty-first, the twenty-fifth, and the twenty-sixth modified examples, in the case of using a hollow conductive member (a pipe), cooling may also be performed by flowing cooling water in a hollow portion of the conductive member.

Figure 12A:
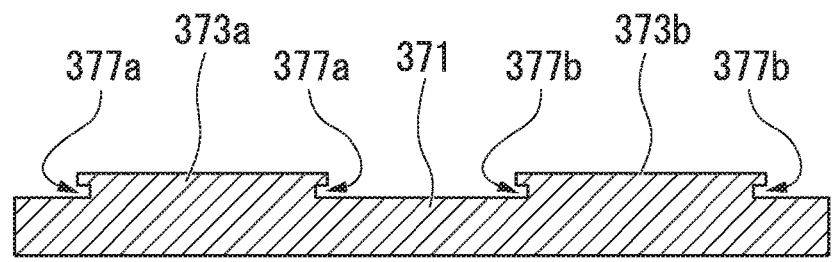
FIG. 12A is a vertical cross-sectional view showing one example of the configuration of a shielding plate according to a thirty-first modified example of the first embodiment.
Figure 12B:
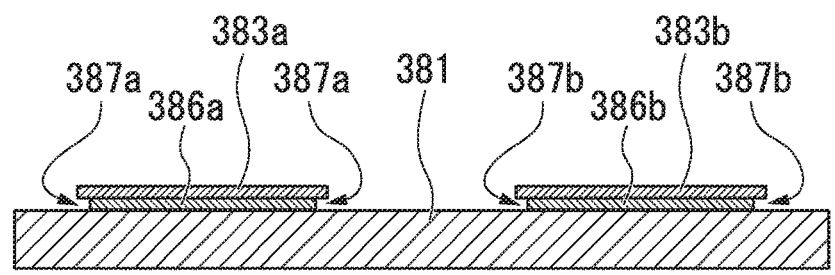
FIG. 12B is a vertical cross-sectional view showing one example of the configuration of a shielding plate according to a thirty-second modified example of the first embodiment.
Figure 12C:
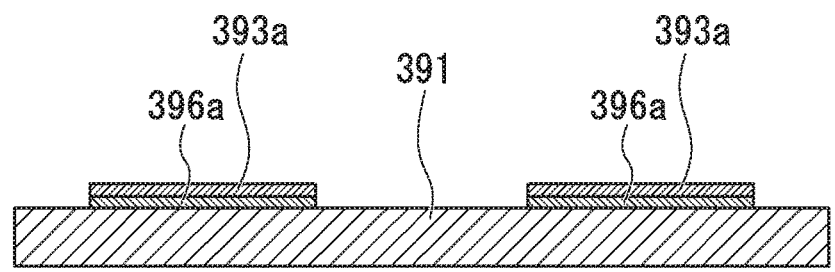
FIG. 12C is a vertical cross-sectional view showing one example of the configuration of a shielding plate according to a thirty-third modified example of the first embodiment.

In FIGS. 12A to 12C, protruded portions are formed on the upper surface of a shielding plate.

In the thirty-first modified example shown in FIG. 12A, protruded portions 373a and 373b (373) which extend in the thickness direction of a shielding plate 371 are formed on the upper surface of the shielding plate 371. Further, depressed portions 377a and 377b (377) are formed in the directions of the centers of the protruded portions 373a and 373b along base ends of the side surfaces of the protruded portions 373a and 373b. In the thirty-second modified example shown in FIG. 12B, insulating materials 386a and 386b (386) are disposed on the upper surface of a shielding plate 381 so as to extend in the thickness direction of the shielding plate 381 and plate-shaped conductive members 383a and 383b (383) are disposed on the insulating materials 386a and 386b (in the extending directions of the insulating materials 386a and 386b). The area of each of the base end faces of the conductive members 383a and 383b where the conductive members 383a and 383b come into contact with the insulating materials 386a and 386b becomes wider than the area of each of the front end faces where the insulating materials 386a and 386b come into contact with the conductive members 383a and 383b. For this reason, each of the depressed portions 387a and 387b (387) is formed between the shielding plate 381 and each of the conductive members 383a and 383b along the side surface of each of the insulating materials 386a and 386b. In the thirty-third modified example shown in FIG. 12C, similarly to the thirty-second modified example, insulating materials 396a and 396b (396) are disposed on the upper surface of a shielding plate 391 so as to extend in the thickness direction of the shielding plate 391 and plate-shaped conductive members 393a and 393b (393) are disposed on the insulating materials 396a and 396b (in the extending directions of the insulating materials 396a and 396b). The area of each of the base end faces of the conductive members 393a and 393b where the conductive members 393a and 393b come into contact with the insulating materials 396a and 396b is the same as the area of each of the front end faces where the insulating materials 396a and 396b come into contact with the conductive members 393a and 393b. For this reason, the side surface of each of the conductive members 393a and 393b and the side surface of each of the insulating materials 396a and 396b are connected to be continuous. In this manner, in the thirty-second and the thirty-third modified examples, the protruded portion is formed on the upper surface of the shielding plate by the insulating material and the conductive member. In the thirty-first to the thirty-third modified examples, an insulating portion (that is, in the thirty-first and the thirty-second modified examples, it is a depressed portion, and in the thirty-third modified example, it is an insulating material) is formed between a front end and a base end of the side surface of the protruded portion such that an eddy current can be secured in an edge of the front end face of the protruded portion.

Description has been made above with regard to the protruded portion (including the protrusion member) which secures the second eddy current independent of the first eddy current flowing in the outermost edge of the upper surface of the shielding plate (the main body of the shielding plate). In addition, the shape (the shape of the upper surface) of the shielding plate is also not limited to a rectangular shape and may also be changed depending on, for example, the position of the inside of the shielding plate, in which the second eddy current flows.

Figure 13A:
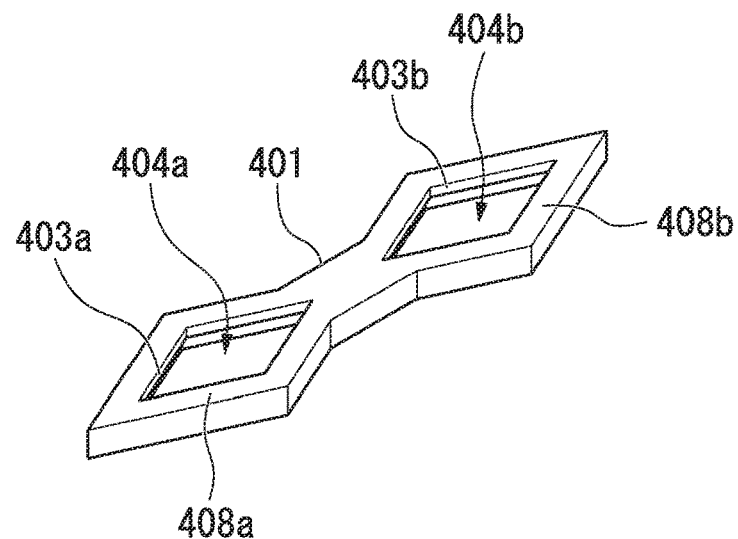
FIG. 13A is a perspective view showing one example of the configuration of a shielding plate in the thirty-fourth modified example of the first embodiment.
Figure 13B:
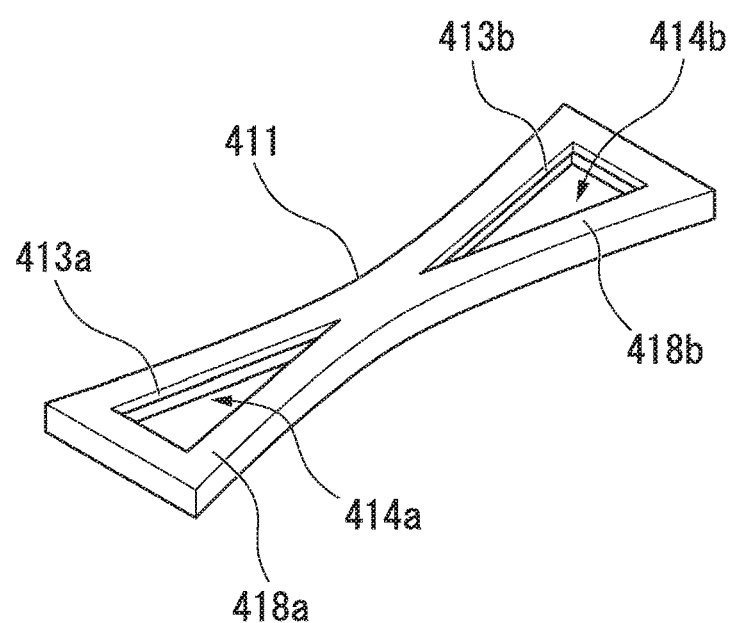
FIG. 13B is a perspective view showing one example of the configuration of a shielding plate according to a thirty-fifth modified example of the first embodiment.

FIGS. 13A and 13B respectively are perspective views showing the thirty-fourth and the thirty-fifth modified examples of the shielding plate. In the FIGS. 13A and 13B, a frame portion following the position of the inside of a shielding plate, in which the second eddy current flows, is provided.

In the thirty-fourth modified example shown in FIG. 13A, depressed portions (two rhombic portions) 404a and 404b (404) are formed in a shielding plate 401 and the shielding plate 401 has frame portions 408a and 408b (408) following the outer peripheral shapes (the opening shape) of the depressed portions 404a and 404b. Further, brims (protruded portions) 403a and 403b (403) are formed in the depressed portions 404a and 404b. Further, in the thirty-fifth modified example shown in FIG. 13B, depressed portions (two triangular portions) 414a and 414b (414) are formed in a shielding plate 411 and the shielding plate 411 has frame portions 418a and 418b (418) following the outer peripheral shapes (the opening shape) of the depressed portions 414a and 414b. Further, brims (protruded portions) 413a and 413b (413) are formed in the depressed portions 414a and 414b. In addition, in the thirty-fourth and the thirty-fifth modified examples, the position of the inside of a shielding plate, which flows the second eddy current, is determined by the depressed portion and the brim. However, it is possible to combine the third to the thirty-third modified examples with the thirty-fourth and the thirty-fifth modified examples.

In this embodiment and the modified examples thereof, the shielding plate has a protruded portion and the side surface of the protruded portion represents a closed loop when viewed from the plate thickness direction (a direction perpendicular to a coil face) of the shielding plate, thereby being able to flow an eddy current in the shielding plate. Further, in order to more reliably flow the eddy current in the vicinity of the protruded portion, it is preferable that an insulating portion be included in the plate thickness direction of the shielding plate including the protruded portion (for example, the first to the fourth, the sixth to the twenty-fifth, the twenty-seventh, and the twenty-ninth to the thirty-fifth modified examples). That is, it is preferable that the protruded portion (the side surface or the end portion of the protruded portion) be partially insulated in a direction perpendicular to the coil face.

<Others>

In this embodiment, the disposition place of the induction heating device 20 is not limited to the position shown in FIG. 1. That is, provided that it is possible to inductively heat a conductive sheet by a transverse method, the induction heating device 20 may also be disposed anywhere. For example, the induction heating device 20 may also be disposed in the second container 12. Further, the induction heating device 20 may also be applied to places other than the continuous annealing line.

Further, in this embodiment, a case where the heating coil width and the gap between the heating coils are equal to each other has been described as an example. However, the heating coil width and the size of the gap are not particularly limited. However, it is preferable that the heating coil width be equal to or greater than the gap (or, the heating coil width be greater than the gap). In this case, a main magnetic field which is generated from the induction heating device 20 becomes more than a leak magnetic field, thereby being able to improve the heating efficiency of the induction heating device 20. In addition, the upper limit of the heating coil width can be appropriately determined according to the conditions such as a space where the induction heating device 20 is disposed, or the weight or the cost which is required for the induction heating device 20. Further, the numbers of heating coils and cores disposed are not particularly limited. For example, a plurality of the heating coil and the core can be disposed in the conveyance direction of the steel strip in order to flexibly perform the heating control of the steel strip.

In addition, the number of shielding plates disposed is also not particularly limited. For example, a plurality of the shielding plate may also be disposed in the conveyance direction of the steel strip in accordance with the numbers of heating coils and cores disposed. A plurality of shielding plates having a single depressed portion may also be disposed to form a shielding plate unit having a plurality of depressed portions.

Further, in this embodiment, a case where the upper side inductor 21 and the lower side inductor 22 are provided has been shown as an example. However, only one of either the upper side inductor 21 or the lower side inductor 22 may also be provided.

Second Embodiment

Next, the second embodiment of the present invention will be described. In the first embodiment, nothing is housed in the depressed portion of the shielding plate (only air is contained in the depressed portion of the shielding plate). In contrast, in this embodiment, a non-conductive soft magnetic material is housed in the depressed portion of the shielding plate. In this manner, this embodiment is mainly different from the first embodiment in that the non-conductive soft magnetic material is housed in the depressed portion of the shielding plate. Therefore, in the description of this embodiment, the same portion as that in the first embodiment is denoted by the same symbol as the symbol used in FIGS. 1 to 5D and a detailed explanation is omitted.

FIGS. 6A to 6D are diagrams showing one example of the configuration of the shielding plate.

Figure 6A:
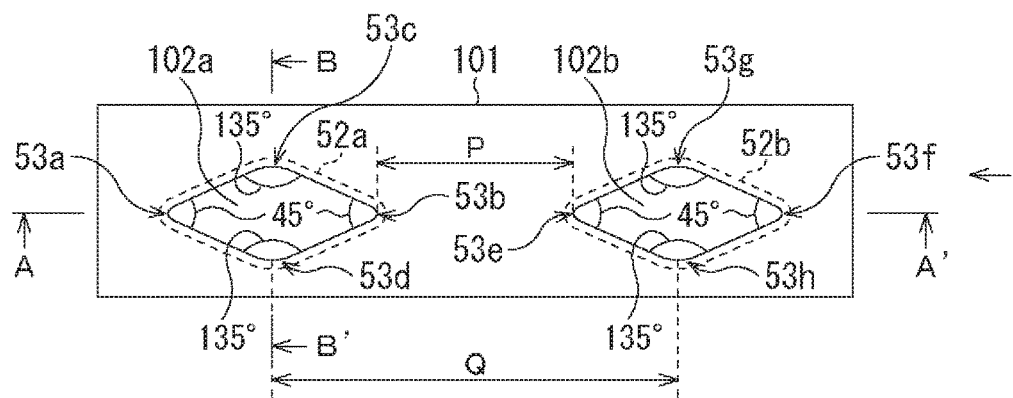
FIG. 6A is a top view showing one example of the configuration of a shielding plate according to the second embodiment of the present invention.
Figure 6B:
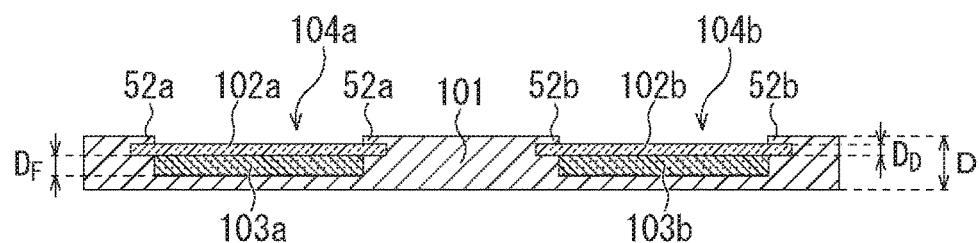
FIG. 6B is a vertical cross-sectional view showing one example of the configuration of the shielding plate according to the second embodiment.
Figure 6C:
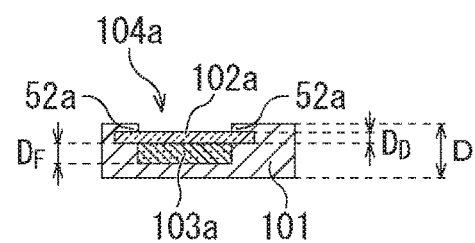
FIG. 6C is a vertical cross-sectional view showing one example of the configuration of the shielding plate according to the second embodiment.
Figure 6D:
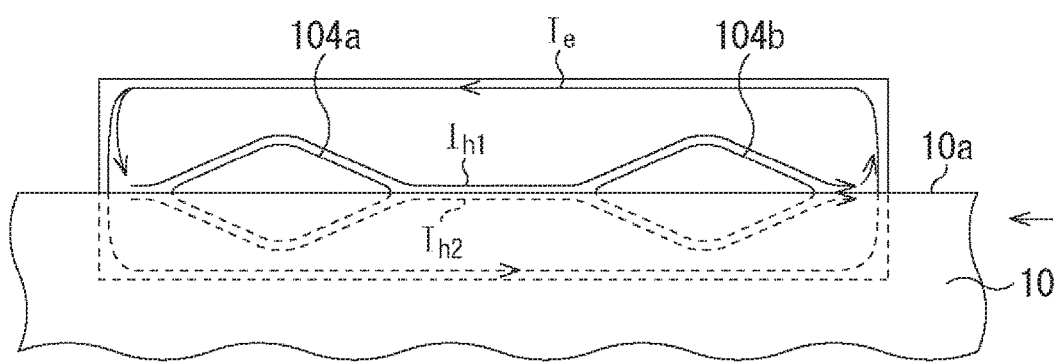
FIG. 6D is a fragmentary view when an area including a shielding plate 101 according to the second embodiment is viewed directly from above the steel strip 10.

Specifically, FIG. 6A is a top view of a shielding plate 101 when viewed from directly above (the steel strip 10 side). Further, FIG. 6B is a vertical cross-sectional view as viewed from the direction of A-A' in FIG. 6A. Further, FIG. 6C is a vertical cross-sectional view as viewed from the direction of B-B' in FIG. 6A. Further, FIG. 6D is a fragmentary view when an area including the shielding plate 101 disposed on the lower side is viewed from directly above the steel strip 10. In addition, in FIG. 6D, only a portion which is required to explain a positional relationship between the steel strip 10 and the shielding plate 101 is shown. Further, in FIG. 6D, the eddy currents $I_e$, $I_{h1}$, and $I_{h2}$ which flow in the shielding plate 101 are conceptually shown. In addition, the steel strip 10 is conveyed in the direction of an arrow shown in the right side in FIGS. 6A and 6D. FIGS. 6A to 6D respectively correspond to FIGS. 4A to 4D.

In FIGS. 6A to 6C, the shielding plate 101 is made of copper and has depressed portions 104a and 104b (104) disposed so as to have a distance to each other in the conveyance direction of the steel strip 10 and having the same size and shape. As shown in FIG. 6A, the shape (the opening shape) in the plate face direction (the plate thickness direction of the shielding plate 101) of each of the depressed portions 104a and 104b is a rhombus in which each of the corner portions 53a to 53h (53) is rounded. In addition, as shown in FIG. 6B, in intermediate portions of the side surfaces of the depressed portions 104a and 104b, depressed portions each having a thickness corresponding to the thickness of each of the heat-resistant plates 102a and 102b (102) (described later) are formed along the circumferential directions of the side surfaces. In this way, at upper ends of the side surfaces of the depressed portions 104a and 104b, the brims 52a and 52b protruding toward the insides (the facing side surface sides) of the depressed portions 104a and 104b from the upper ends of the side surfaces are formed.

Non-conductive soft magnetic plates 103a and 103b (103) made of a soft magnetic ferrite (for example, a Mn—Zn-based ferrite or a Ni—Zn-based ferrite) are housed in bottom portions of the depressed portions 104a and 104b. Each of the non-conductive soft magnetic plates 103a and 103b has a shape corresponding with the shape (the shape of a cross-section perpendicular to the thickness direction of the shielding plate 101) in the plate face direction of the bottom portion of each of the depressed portions 104a and 104b, and a thickness $D_F$ thereof is 5 [mm]. In addition, the inventors have confirmed that in a frequency range (5 [kHz] to 10 [kHz]) which is used in the induction heating device 20, if the thickness $D_F$ is equal to or more than 1 [mm] (and is equal to or less than the depth of each of the depressed portions 104a and 104b), in a case where the non-conductive soft magnetic plates 103a and 103b are housed and a case where the non-conductive soft magnetic plates 103a and 103b are not housed, a sufficient difference occurs in the effect of reducing the above-mentioned difference in temperature.

In addition, the heat-resistant plates 102a and 102b which protect the non-conductive soft magnetic plates 103a and 103b from heat from the outside are disposed on the top (the steel strip 10 side) of the non-conductive soft magnetic plates 103a and 103b in the depressed portions 104a and 104b. A thickness $D_D$ of each of the heat-resistant plates 102a and 102b is 10 [mm]. Here, end portions of the heat-resistant plates 102a and 102b enter into the depressed portions which are formed in the intermediate portions of the side surfaces of the depressed portions 104a and 104b so that the heat-resistant plates 102a and 102b do not come out of the depressed portions 104a and 104b. In order to house the heat-resistant plates 102a and 102b in the depressed portions 104a and 104b in this way, it is preferable if the heat-resistant plates 102a and 102b are made of a deformable material.

As described above, by housing the non-conductive soft magnetic plates 103a and 103b in the depressed portions 104a and 104b, a magnetic field which is generated by an eddy current flowing in the shielding plate 101 due to the main magnetic flux is strengthened. By the strengthening of the magnetic field, the magnitudes of the eddy currents $I_{h1}$ and $I_{h2}$ flowing along the edges of the depressed portions 104a and 104b also become larger. Therefore, magnetic fields which are generated by these eddy currents also become large, so that a larger eddy current which cancels out the eddy current flowing in the side end portion of the steel strip 10 can be produced in the vicinity of the side end portion. As a result, the effect of sufficiently pushing the eddy current of the side end portion of the steel strip 10 which is produced by the main magnetic flux into the inside in the width direction of the steel strip 10 is produced. Further, since the eddy currents $I_{h1}$ and $I_{h2}$ flowing along the edges of the depressed portions 104a and 104b become large, even if the steel strip 10 moves in a meandering manner, the magnitudes of the eddy currents $I_{h1}$ and $I_{h2}$ and the effect of pushing the eddy current flowing in the side end portion of the steel strip 10 further into the inside than the side end portion can be maintained to some extent. Therefore, even if the steel strip 10 moves in a meandering manner, it is possible to enhance the effect of reducing a change in the temperature distribution in the width direction of the steel strip 10. In the case of using conductive materials in place of the non-conductive soft magnetic plates 103a and 103b, since the shielding plate itself is conductive, the conductive material and the shielding plate act as an integrated conductive member, so that it is not possible to strongly limit the distribution of the eddy current to the edges of the depressed portions 104a and 104b.

As described above, in this embodiment, the non-conductive soft magnetic plates 103a and 103b are housed in the depressed portions 104a and 104b. Therefore, both the smoothing of the temperature distribution in the width direction of the steel strip 10 and reduction of a change in the temperature distribution in the width direction of the steel strip 10 at the time of meandering of the steel strip 10 can be more effectively realized.

Further, in this embodiment, since the heat-resistant plates 102a and 102b are disposed on the top (the steel strip 10 side) of the non-conductive soft magnetic plates 103a and 103b, even if the induction heating device is used under high temperature, degradation of the characteristics of the non-conductive soft magnetic plates 103a and 103b can be prevented. However, in a case where the induction heating device is not used under high temperature, there is no need to necessarily use the heat-resistant plates 102a and 102b.

In addition, a material constituting the non-conductive soft magnetic plates 103a and 103b is not limited to a soft magnetic ferrite, provided that it is a non-conductive soft magnetic material. Further, the non-conductive soft magnetic material may also be a material in which powder or particles are packed or compacted, or a material in which a plurality of blocks is combined, rather than a plate. Further, the heat-resistant plates 102a and 102b also need not necessarily be plates and may also be any material, provided that a heat-resistant material is used. Further, the shapes of the non-conductive soft magnetic plates 103a and 103b are not particularly limited. If the non-conductive soft magnetic plate can be disposed according to the portion (for example, the edge of the depressed portion) of the inside of the shielding plate 101, in which an eddy current flows, since it is possible to obtain a magnetic field which enhances the eddy current, for example, the non-conductive soft magnetic plate may also have a hollow portion. However, in order to sufficiently use the magnetism of the non-conductive soft magnetic plate, it is preferable that the non-conductive soft magnetic plate be solid. In this embodiment, by the protruded portion which makes an eddy current be secured inside the shielding plate and the non-conductive soft magnetic material which enhances the eddy current, in a case where the conductive sheet of the heating target moves in a meandering manner, variation in temperature distribution in the width direction of the conductive sheet can be more reliably prevented.

Further, a method of fixing the non-conductive soft magnetic plates 103a and 103b and the heat-resistant plates 102a and 102b which are housed in the depressed portions 104a and 104b, to the insides of the depressed portions 104a and 104b is not limited to the method described above. For example, it is possible to fix them to the depressed portion with an adhesive, or fix them to the depressed portion using a screw with insulation secured between the shielding plate 101 and the non-conductive soft magnetic plates 103a and 103b and the heat-resistant plates 102a and 102b.

Further, also in this embodiment, various modified examples (the first to the thirty, the thirty-fourth, and the thirty-fifth modified examples) described in the first embodiment can be adopted. For example, the non-conductive soft magnetic plate can be disposed in the depressed portion of the shielding plate in the fifth to the twenty-first, the thirty-fourth, and the thirty-fifth modified examples and the depressed portion which is formed by the conductive member in the twenty-second to the thirtieth modified examples.

Further, the shape and the number of depressed portions or protruded portions of the shielding plate in the plate face direction are not particularly limited. In addition, the shape and the number of non-conductive soft magnetic plates are also not particularly limited.

In addition, in the case of using the non-conductive soft magnetic material, it is preferable to make the magnitude of the eddy current in the shielding plate which flows through the vicinity of the non-conductive soft magnetic material, as large as possible. For example, if the shielding plate has a cross section (a cross section parallel to the coil face) perpendicular to the thickness direction including the non-conductive soft magnetic material, the distance between the non-conductive soft magnetic material and the eddy current in the shielding plate, which is strengthened by the non-conductive soft magnetic plate, can be shortened. Further, the above-mentioned boundary portion represents a closed curve (is ring-shaped), so that an area of an eddy current which is enhanced can increase and the characteristic of the non-conductive soft magnetic plate can be fully utilized. In addition, in order to make the magnitude of the eddy current in the shielding plate which flows through the vicinity of the non-conductive soft magnetic material, as large as possible, it is preferable that the shielding plate and the non-conductive soft magnetic material be in contact with each other. However, a space (a space as a boundary portion) may also be present between the shielding plate and the non-conductive soft magnetic material such that the non-conductive soft magnetic material can be easily mounted on the shielding plate.

Further, in the case of using the induction heating device under high temperature or the case of rapidly heating the steel strip, the temperature of the shielding plate sometimes becomes high due to an eddy current. In this case, it is preferable to cool the shielding plate and the non-conductive soft magnetic material with a cooler such as a water-cooling pipe. This cooling method is not particularly limited. For example, the shielding plate may also be cooled by integrally forming a water-cooling line in the shielding plate, or the shielding plate may also be cooled by sending a gas to the shielding plate by a blower.

Example

Figure 7:
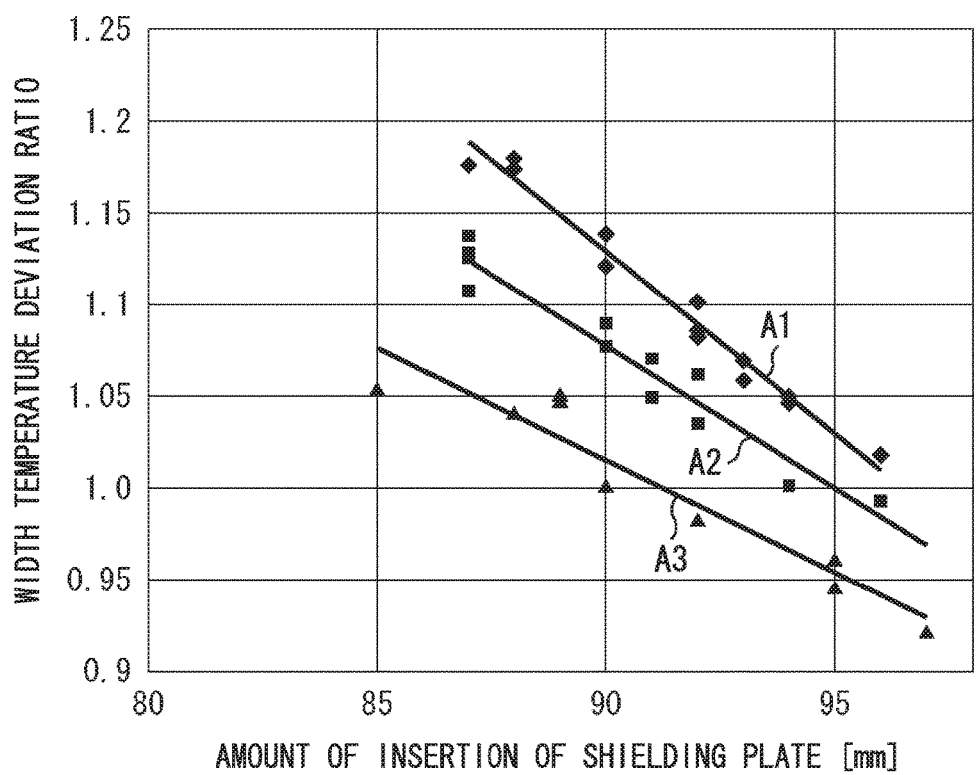
FIG. 7 is a diagram showing one example of the relationship between the amount of insertion of the shielding plate and a width temperature deviation ratio in examples using the second embodiment.

FIG. 7 is a diagram showing one example of the relationship between the amount of insertion of the shielding plate and a width temperature deviation ratio.

The amount of insertion of the shielding plate corresponds to the "overlap length R in the width direction of the steel strip 10" between each of both side end portions of the steel strip 10 and each shielding plate (refer to FIG. 2B). Further, the width temperature deviation ratio is a value (=sheet width central portion temperature/sheet end portion temperature) obtained by dividing the temperature of the central portion in a temperature distribution in the width direction of the steel strip 10 (the sheet width central portion temperature) by the temperature of the end portion (the sheet end portion temperature).

In FIG. 7, in a graph A1, a plain shielding plate in which no depressed portion is formed was used. In a graph A2, a shielding plate in which brimmed depressed portions are formed, as in the first embodiment, was used. In a graph A3, a shielding plate in which brimmed depressed portions are formed and a non-conductive soft magnetic plate is housed in each depressed portion, as in the second embodiment, was used.

Here, the graphs shown in FIG. 7 are based on the results of experiments performed under the following conditions.

| | |
|---|---|
| Heating coil width: | 1300 [mm] |
| Material of core: | Ni—Zn ferrite |
| Material to be heated: | stainless steel sheet (width of 900 [mm], and thickness of 0.3 [mm]) |
| Gap between coils: | 180 [mm] |
| Sheet conveyance speed: | 50 [mpm (m/min.)] |
| Heating temperature: | 400 to 730 [° C.] (temperature increase of the center is set to be 330 [° C.]) |
| Power-supply frequency: | 8.5 [kHz] |
| Current: | 3650 [AT] |
| Material of shielding plate: | copper |
| External dimension of shielding plate: | width of 230 [mm], depth of 600 [mm], and thickness of 25 [mm] |
| Shape of depressed portion of shielding plate: | FIG. 4A (graph A2) and FIG. 6A (graph A3) |
| Protruding length of brim of depressed portion: | 5 [mm] |
| Thickness of brim of depressed portion: | 5 [mm] |
| Material of non-conductive soft magnetic plate: | Ni—Mn ferrite |
| Thickness of non-conductive soft magnetic plate: | 5 [mm] |
| Standard of amount of insertion of shielding plate: | 90 [mm] |

In FIG. 7, it can be found that the smaller the width temperature deviation ratio (the closer to 1 the width temperature deviation ratio), the more uniform a temperature distribution in the width direction of the steel strip 10 can be. Further, it can be found that the smaller the slope of the graph, the greater the change in the temperature distribution in the width direction of the steel strip 10 can be reduced even if the steel strip 10 moves in a meandering manner.

In FIG. 7, it can be found that if the shielding plate with the brimmed depressed portions formed therein is used, as in the first embodiment, both the smoothing of a temperature distribution in the width direction of the steel strip 10 and reduction of a change in the temperature distribution in the width direction of the steel strip 10 at the time of meandering of the steel strip 10 can be realized (refer to the graphs A1 and A2). In addition, it can be found that if the non-conductive soft magnetic plate is housed in the depressed portion, as in the second embodiment, these effects become even further pronounced (refer to the graphs A2 and A3).

In addition, all the embodiments of the present invention described above merely show examples embodied in implementation of the present invention and the technical scope of the present invention should not be construed as being limited by these. That is, the present invention can be implemented in various forms without departing from the technical idea thereof or the main features thereof.

Industrial Applicability

A transverse flux induction heating device is provided which allows unevenness of a temperature distribution in the width direction of a conductive sheet of a heating target to be reduced and allows variation in temperature distribution in the width direction of the conductive sheet of the heating target due to meandering of the conductive sheet to be reduced.

Reference Symbol List

- 10: steel strip (conductive sheet)
- 18: alternating-current power supply unit
- 20: induction heating device
- 21: upper side inductor
- 22: lower side inductor
- 23, 27: core
- 24: upper side heating coil (heating coil)
- 28: lower side heating coil (heating coil)
- 31, 61, 71, 81, 91, 101, 111, 121, 131, 141, 151, 161, 171, 181, 191, 201, 211, 221, 231, 241, 251, 261, 271, 281, 291, 301, 311, 321, 331, 341, 351, 361, 371, 381, 391, 401, 411: shielding plate
- 51, 62, 72, 82, 92, 104, 114, 124, 134, 144, 154, 164, 174, 184, 194, 204, 214, 224, 234, 244, 254, 264, 274, 377, 387, 404, 414: depressed portion
- 52, 64, 74, 83, 93, 403, 413: brim (protruded portion)
- 113, 123, 133, 143, 153, 163, 173, 183, 193, 203, 213, 223, 233, 243, 253, 263, 273: protruded portion
- 283, 293, 303, 313, 323, 333, 343, 353, 363: protrusion member (protruded portion)
- 373, 383, 393: protruded portion
- 285, 295, 305, 315, 325, 335, 345, 355, 365: bolt
- 102: heat-resistant plate (heat-resistant material)
- 103: non-conductive soft magnetic plate (non-conductive soft magnetic material)

What is claimed is:

1. A transverse flux induction heating device which allows an alternating magnetic field to intersect a sheet face of a conductive sheet which is conveyed in one direction, thereby inductively heating the conductive sheet, the transverse flux induction heating device comprising:
    a heating coil disposed such that a coil face faces the sheet face of the conductive sheet;
    a core around which the heating coil is coiled; and
    a shielding plate formed of an electrical conductor and disposed between the core and a side end portion in a direction perpendicular to a conveyance direction of the conductive sheet, the shielding plate facing the side end portion,
    wherein the shielding plate has a protruded portion, and a side surface of the protruded portion represents a closed loop when viewed from a direction perpendicular to the coil face, and
    wherein a depressed portion which faces the side end portion in the direction perpendicular to the conveyance direction of the conductive sheet is formed in a surface of the shielding plate, the surface facing the conductive sheet.

2. The transverse flux induction heating device according to claim 1, further comprising a non-conductive soft magnetic material which is attached to the shielding plate,
    wherein the shielding plate is interposed between the core and the non-conductive soft magnetic material.

3. The transverse flux induction heating device according to claim 2, further comprising a heat-resistant material which is attached to the non-conductive soft magnetic material,
    wherein the heat-resistant material is disposed closer to the conductive sheet than the non-conductive soft magnetic material.

4. The transverse flux induction heating device according to claim 2, wherein the shielding plate has a cross section parallel to the coil face, the cross section including the non-conductive soft magnetic material.

5. The transverse flux induction heating device according to claim 2, wherein the protruded portion is partially insulated in a direction perpendicular to the coil face.

6. The transverse flux induction heating device according to claim 1, wherein the protruded portion is partially insulated in a direction perpendicular to the coil face.

7. The transverse flux induction heating device according to claim 1, wherein a portion which is tapered off toward a side close to a central portion in the direction perpendicular to the conveyance direction of the conductive sheet from a side away from the central portion in the direction perpendicular to the conveyance direction of the conductive sheet is included in the depressed portion.

8. The transverse flux induction heating device according to claim 1, wherein
    a first portion which is tapered off toward a downstream side from an upstream side in the conveyance direction of the conductive sheet and a second portion which is tapered off toward the upstream side from the downstream side in the conveyance direction of the conductive sheet are included in the depressed portion, and
    the first portion and the second portion face each other in the conveyance direction of the conductive sheet.

9. The transverse flux induction heating device according to claim 8, wherein
    the first portion is rounded toward the downstream side, and
    the second portion is rounded toward the upstream side.

* * * * *